(12) United States Patent
Li et al.

(10) Patent No.: US 9,547,793 B2
(45) Date of Patent: Jan. 17, 2017

(54) METHOD AND SYSTEM FOR DIVIDING PLANT ORGAN POINT CLOUD

(71) Applicant: SHENZHEN INSTITUTES OF ADVANCED TECHNOLOGY, Shenzhen (CN)

(72) Inventors: Yangyan Li, Shenzhen (CN); Baoquan Chen, Shenzhen (CN); Xiaochen Fan, Shenzhen (CN)

(73) Assignee: Shenzhen Institutes of Advanced Technology, Shenzhen, Guangdong (CN)

( * ) Notice: Subject to any disclaimer, the term of this patent is extended or adjusted under 35 U.S.C. 154(b) by 0 days.

(21) Appl. No.: 14/765,806

(22) PCT Filed: Sep. 13, 2013

(86) PCT No.: PCT/CN2013/083455
§ 371 (c)(1),
(2) Date: Aug. 4, 2015

(87) PCT Pub. No.: WO2014/169562
PCT Pub. Date: Oct. 23, 2014

(65) Prior Publication Data
US 2015/0379350 A1  Dec. 31, 2015

(30) Foreign Application Priority Data
Apr. 19, 2013  (CN) .......................... 2013 1 0138373

(51) Int. Cl.
*G06K 9/00* (2006.01)
*A01G 1/00* (2006.01)
(Continued)

(52) U.S. Cl.
CPC .......... *G06K 9/00657* (2013.01); *A01G 1/001* (2013.01); *G06K 9/00201* (2013.01);
(Continued)

(58) Field of Classification Search
None
See application file for complete search history.

(56) References Cited

U.S. PATENT DOCUMENTS

2011/0305372 A1* 12/2011 Schnorr .................. G01S 17/89
382/110
2012/0169498 A1*  7/2012 Leppanen .......... G06K 9/00657
340/540

FOREIGN PATENT DOCUMENTS

| CN | 102256061 | 11/2011 |
| CN | 102467753 | 5/2012 |
| CN | 102938162 | 2/2013 |

OTHER PUBLICATIONS

Dornbusch, Tino, Peter Wernecke, and Wulf Diepenbrock. "A method to extract morphological traits of plant organs from 3D point clouds as a database for an architectural plant model." Ecological Modelling 200.1 (2007): 119-129.*
(Continued)

*Primary Examiner* — Stephen R Koziol
*Assistant Examiner* — Sean Conner
(74) *Attorney, Agent, or Firm* — Ladas & Parry, LLP

(57) ABSTRACT

Disclosed are a method and system for dividing a plant organ point cloud. According to information about lamina point cloud blocks and stem point cloud blocks in a previous adjacent point cloud frame of a point cloud frame to be divided and a flatness feature of a data point of the point cloud frame to be divided, a point cloud of the point cloud frame to be divided is divided into lamina point cloud blocks and stem point cloud blocks; taking the adjacent point cloud frame as a reference to divide the point cloud frame facilitates the divided organ in maintaining the consistency of time and space between adjacent point cloud frames, and improves the accuracy of plant organ division. When a new lamina point cloud block or a stem point cloud block is
(Continued)

discovered, the point cloud in the point cloud frame before the point cloud block to be divided is redivided through tracking back; when redividing, according to information about the lamina point cloud blocks and the stem point cloud blocks in the next adjacent point cloud frame, the point cloud frame to be redivided is divided; and the redivision during tracking back facilitates extracting, from the point cloud frame, a new lamina point cloud block or a stem point cloud block which was not discovered in the previous division process, thereby further improving the accuracy of plant organ division.

12 Claims, 7 Drawing Sheets

(51) Int. Cl.
*G06T 7/00* (2006.01)
*G09B 9/00* (2006.01)

(52) U.S. Cl.
CPC .......... *G06T 7/0079* (2013.01); *G06T 7/0087* (2013.01); *G06T 7/0093* (2013.01); *G06T 7/0097* (2013.01); *G06T 2207/10028* (2013.01); *G09B 9/00* (2013.01)

(56) References Cited

OTHER PUBLICATIONS

Livny, Yotam, et al. "Automatic reconstruction of tree skeletal structures from point clouds." ACM Transactions on Graphics (TOG). vol. 29. No. 6. ACM, 2010.*

International Search Report mailed on Jan. 23, 2014 for International Application No. PCT/CN2013/083455 and its English translation.

* cited by examiner

METHOD AND SYSTEM FOR DIVIDING PLANT ORGAN POINT CLOUD

CROSS-REFERENCE TO RELATED APPLICATION(S)

This application is the U.S. National Stage of International Patent Application No. PCT/CN2013/083455 filed on Sep. 13, 2013, which claims priority to Chinese Patent Application No. 201310138373.0 filed on Apr. 19, 2013, the disclosures of which are hereby incorporated in their entireties by reference.

BACKGROUND

Technical Field

The present invention relates to the field of point cloud processing, and particularly to a method and system for dividing a plant organ point cloud.

Related Art

In order to monitor and quantize plant growth events, such as emergence and withering events of a plant organ (e.g., stem or lamina), it is necessary to acquire a four-dimensional point cloud of a plant constantly during the whole life cycle of the plant and divide the four-dimensional point cloud according to plant organs, to obtain state data of respective plant organs, thereby performing quantitative analysis on the respective plant organs.

A traditional method divides a plant point cloud according to a geometric structure (e.g., a curly structure of a lamina), volume and a topological structure (e.g., a stem branch structure) of a plant, so as to divide the plant point cloud into respective separate plant organs.

However, the plant not only slowly and continuously grows or declines, but also may ceaselessly move due to seeking a better living environment or other reasons, therefore, the geometric structure, volume and the topological structure of the plant will change greatly. So, the traditional method has errors when dividing the plant point cloud according to a plant organ.

SUMMARY

In view of this, it is necessary to provide a method and system for dividing a plant organ point cloud which can improve division accuracy.

A method for dividing a plant organ point cloud, including the following steps S120-S160:

S120: acquiring point cloud frames corresponding to multiple plant growth times of a monitored plant, and denoting the acquired multiple point cloud frames as $F^1, \ldots, F^t, \ldots, F^n$ according to a sequence of the corresponding plant growth times;

S140: dividing a point cloud in the first point cloud frame $F^1$ into a lamina point cloud block and a stem point cloud block according to a flatness feature of a data point in the first point cloud frame $F^1$; and S160: dividing the point cloud frames $F^2$ to $F^n$ after the first point cloud frame into lamina point cloud blocks and stem point cloud blocks according to a sequence of corresponding plant growth times, wherein the dividing a point cloud in a certain point cloud frame $F^t$ ($2 \leq t \leq n$) into a lamina point cloud block and a stem point cloud block includes the following steps S220-S280:

S220: according to information about a lamina point cloud block and a stem point cloud block in a previous point cloud frame $F^{t-1}$ of $F^t$ and a flatness feature of a data point of the $F^t$, dividing the point cloud in the $F^t$ into a lamina point cloud block and a stem point cloud block;

S240: judging whether the number of the stem point cloud blocks contained in $F^t$ is larger than that of the stem point cloud blocks contained in $F^{t-1}$ or whether the number of the lamina point cloud blocks contained in $F^t$ is larger than that of the lamina point cloud blocks contained in $F^{t-1}$, if no, performing step S260, and if yes, performing step S280;

S260: if t<n, entering the step of dividing the point cloud in the next point cloud frame $F^{t+1}$ of $F^t$ into lamina point cloud blocks and stem point cloud blocks, if t=n, ending; and S280: tracking back to successively redivide the point cloud in the previous point cloud frame of the $F^t$ until the number of the lamina point cloud blocks and the stem point cloud blocks of the redivided point cloud frame does not increase, and then stopping tracking back and entering the step of dividing the point cloud in the next point cloud frame $F^{t+1}$ of $F^t$ into lamina point cloud blocks and stem point cloud blocks, and the step of redividing the point cloud of a certain point cloud frame $F^j$ ($1 \leq j \leq t-1$) before $F^t$ includes:

S282: according to the information about the lamina point cloud blocks and the stem point cloud blocks in the next point cloud frame $F^{j+1}$ of $F^j$ and the flatness feature of the data points of $F^j$, dividing the point cloud in $F^j$ into the lamina point cloud blocks and the stem point cloud blocks.

In one embodiment, if the $F^t$ r in step S220 is denoted as a point cloud frame to be divided, the $F^{t-1}$ is denoted as an adjacent point cloud frame of the point cloud frame to be divided, the $F^j$ in step S282 is denoted as a point cloud frame to be divided, and the $F^{j+1}$ is denoted as an adjacent point cloud frame of the point cloud frame to be divided, the step of, according to information about lamina point cloud blocks and stem point cloud blocks in an adjacent point cloud frame of a point cloud frame to be divided and a flatness feature of a data point of the point cloud frame to be divided, dividing a point cloud of the point cloud frame to be divided into lamina point cloud blocks and stem point cloud blocks includes the following steps S310-S360:

S310: according to the information about lamina point cloud blocks and stem point cloud blocks in the adjacent point cloud frame of the point cloud frame to be divided and the flatness feature of the data point in the point cloud frame to be divided, classifying the data point in the point cloud frame to be divided as a lamina point or a stem point;

S320: aggregating lamina points, which are connected with each other, in the point cloud frame to be divided to make up a lamina point cloud block;

S330: establishing a minimum spanning tree of stem points in the point cloud frame to be divided, dividing the minimum spanning tree into a separate branch that do not comprise forked stems, and mapping the stem points in the point cloud frame onto respective separate branches, to form respective stem point cloud blocks, wherein one separate branch corresponds to one stem point cloud block;

S340: finding out point cloud blocks, which have most overlapping data points, corresponding to each lamina point cloud block and each stem point cloud block in the point cloud frame to be divided and the adjacent point cloud frame, marking the corresponding point cloud blocks, and extracting the lamina point cloud blocks and the stem point cloud blocks, which are marked less than twice, in the point cloud frame to be divided and the adjacent point cloud frame;

S350: classifying the lamina points in the point cloud frame to be divided to categories corresponding to the lamina point cloud blocks extracted, and making the lamina points within the same category form one lamina point cloud block in the point cloud frame to be divided; and S360: classifying the stem points in the point cloud frame to be divided to categories corresponding to the lamina point cloud blocks extracted, and making the stem points within the same category form one stem point cloud block in the point cloud frame to be divided.

In one embodiment, step S310 includes the following steps:

S410: solving to cause a target energy function to reach the least classification function, the target energy function being a function about a classification function, of which the function value denotes classification cost, and the classification function being a classification function that classifies data points of the point cloud frame to be divided into lamina points and stem points;

wherein a data point set in the point cloud frame to be divided is denoted as $P^t = \{p^t\}$ and a plant organ data point category set is denoted as $\{L, S\}$, wherein represents a lamina point category, S represents a stem point set, $f_B$ is a classification function that maps $P^t$ to the set $\{L, S\}$, and the target energy function is as follows:

$$E(f_B) = \sum_{p^t \in P^t} D_{p^t}(f_B(p^t)) + \sum_{p^t, q^t \in N_{p^t}} V_{p^t, q^t}(f_B(p^t), f_B(q^t))$$

wherein:
(1) $D_{p^t}(f_B(p^t))$ denotes the cost at which a data point of $p^t$ is classified $f_B(p^t)$;

$$D_{p^t}(L) = \begin{cases} \max(R(p^t) - R(L_{l*}), 0) & \text{if } |\{L_l\}| \neq 0 \text{ and } |\{S_s\}| \neq 0 \\ R(p^t) - \mathfrak{R}_L & \text{if } |\{L_l\}| = 0 \text{ or } |\{S_s\}| = 0 \end{cases}$$

$$D_{p^t}(S) = \begin{cases} \max(R(S_{s*}) - R(p^t), 0), & \text{if } |\{L_l\}| \neq 0 \text{ and } |\{S_s\}| \neq 0 \\ \mathfrak{R}_S - R(p^t), & \text{if } |\{L_l\}| = 0 \text{ or } |\{S_s\}| = 0 \end{cases}$$

$D_{p^t}(L)$ is the cost of $f_B(p^t) = L$, and $D_{p^t}(S)$ is the cost of $D_{p^t}(S)$, $R(p^t)$ is a flatness feature of $p^t$, $R(p^t) = \log(\max(C(p^t), c_\epsilon))$, $c_\epsilon$ is a preset constant greater than 0 and less than 1/3, $C(p^t)$ is a curvature feature of $p^t$, $C(p^t) = \lambda_1/(\lambda_1 + \lambda_2 + \lambda_3)$, wherein $\lambda_1$, $\lambda_2$ and $\lambda_3$ are eigenvalues obtained by principal component analysis on neighborhood points of $p^t$, and $\lambda_1 \leq \lambda_2$ and $\lambda_1 \leq \lambda_3$;

$\{L_l\}$ is a set of lamina point cloud blocks in an adjacent point cloud frame, $|\{L_l\}|$ is the number of $\{L_l\}$ elements, $L_{l*}$ is a lamina point cloud block, nearest the $p^t$, in $\{L_{l*}\}$, and $R(L_{l*})$ is an average value of flatness features of data points in the $L_{l*}$; $\{S_s\}$ is a set of stem point cloud blocks in the adjacent point cloud frame, $|\{S_s\}|$ is the number of $\{S_s\}$ elements, $S_{s*}$ is a stem point cloud block, nearest the $p^t$, in $\{S_s\}$, and $R(S_{s*})$ is an average value of flatness features of data points in the $S_{s*}$;

$$\mathfrak{R}_L = \log(c_\epsilon), \mathfrak{R}_S = \log\left(\frac{1}{3}\right);$$

(2) $q^t$ is a data point adjacent to $p^t$ in $P^t$;
$N_{p^t} = \{(p^t, q^t)\} = \{(p^t, q^t) \in \text{Delaunay}(P^t) : |p^t - q^t| < \epsilon\}$, $N_{p^t}$ is a neighborhood system formed based on Delaunay triangulation on $P^t$ and removal of sides greater than a threshold $\epsilon$;

$V_{p^t, q^t}(f_B(p^t), f_B(q^t))$ denotes the cost at which adjacent data points $p^t$ and $q^t$ are classified as $f_B(p^t)$ and $f_B(q^t)$, $$V_{p^t, q^t}(f_B(p^t), f_B(q^t)) = \begin{cases} \max\left(\frac{1}{C(p^t)}, \frac{1}{C(q^t)}\right), & \text{if } f(p^t) \neq f(q^t) \\ 0, & \text{if } f(p^t) = f(q^t) \end{cases}$$

wherein $(p^t, q^t) \in N_{p^t}$, $C(p^t)$ is a curvature feature of $p^t$, and $C(q^t)$ is a curvature feature of $q^t$; and S420: classifying the data points in the point cloud frame to be divided as lamina points or stem points according to the classification function obtained through solving.

In one embodiment, the corresponding categories of the lamina point cloud blocks extracted are respectively denoted as $L_1, L_2, \ldots, L_m$, LP is a set of lamina points in the point cloud frame to be divided, and $f_L(\ )$ is a lamina classification function that maps LP to $\{L_1, L_2, \ldots, L_m\}$; and the step of classifying the lamina points in the point cloud frame to be divided to categories corresponding to the lamina point cloud blocks extracted in step S350 is: solving to cause the following lamina classification cost function $E(f_L)$ to reach the least lamina point classification function $f_L(\ )$, and classifying the lamina points in the point cloud frame to be divided to the categories corresponding to the lamina point cloud blocks extracted according to the lamina point classification function obtained through solving:

$$E(f_L) = \sum_{p^t \in LP} D_{p^t}(f_L(p^t)) + \sum_{p^t, q^t \in N_{L^t}} V_{p^t, q^t}(f_L(p^t), f_L(q^t))$$

wherein:
(1)
$$D_{p^t}(f_L(p^t)) = d(p^t, f_L(p^t))$$

$D_{p^t}(f_L(p^t))$ denotes the cost at which a lamina point $p^t$ is classified to $f_L(p^t)$, and $d(p^t, f_L(p^t))$ denotes a distance from a data point $p^t$ to the nearest point in a target block $f_L(p^t)$;

(2)
$q^t$ is a data point adjacent to $p^t$ in LP;
$N_{L^t}$ is a neighborhood system formed based on Delaunay triangulation on LP and removal of sides greater than a threshold $\epsilon$; and $V_{p^t, q^t}(\ )$ is defined the same as the $V_{p^t, q^t}(\ )$, and $V_{p^t, q^t}(f_L(p^t), f_L(q^t))$ denotes the cost at which adjacent data points $p^t$ and $q^t$ are classified as $f_L(p^t)$ and $f_L(q^t)$.

In one embodiment, the categories corresponding to the stem point cloud blocks extracted are respectively denoted as $S_1, S_2, \ldots, S_n$, SP is a set of stem points in the point cloud frame to be divided, and $f_S(\ )$ is a stem classification function that maps SP to $\{S_1, S_2, \ldots, S_n\}$; and the step of classifying the stem points in the point cloud frame to be divided to categories corresponding to the stem point cloud blocks extracted in step S360 is: solving to cause the following stem classification cost function $E(f_S)$ to reach the least stem point classification function $f_S(\ )$, and classifying the stem points in the point cloud frame to be divided to the categories corresponding to the stem point cloud blocks extracted according to the stem point classification function obtained through solving:

$$E(f_s) = \sum_{p^t \in sp} D_{p^t}(f_s(p^t)) + \sum_{p^t, q^t \in N_{s^t}} V_{p^t, q^t}(f_s(p^t), f_s(q^t))$$

wherein:

(1)

$$D_{p^t}(f_s(p^t)) = \begin{cases} o(p^t) - O(f_s(p^t)) & \text{if } d(p^t, f_s(p^t)) \leq \Delta \\ Y & \text{if } d(p^t, f_s(p^t)) \geq \Delta \end{cases}$$

$D_{p^t}(f_S(p^t))$ denotes the cost at which a stem point $p^t$ is classified to $f_S(p^t)$, $o(p^t)$ is orientation information of $p^t$, $o(p^t)=(x,y,z)$, wherein x, y and z are diagonal elements of an eigenvector matrix obtained by principal component analysis on neighborhood points of $p^t$, $O(f_S(p^t))$ is an average value of orientation information of all stem points in a stem point cloud block corresponding to $f_S(p^t)$. $\Delta$ is a preset distance threshold, Y is a preset penalty term, and $d(p^t, f_S(p^t))$ is a distance between $d(p^t, f_S(p^t))$ and the stem point cloud block corresponding to $f_S(p^t)$;

(2)

$q^t$ is a data point adjacent to $p^t$ in SP;

$N_{S^t}$ is a neighborhood system formed based on Delaunay triangulation on SP and removal of sides greater than a threshold $\epsilon$; and $V_{p^t,q^t}( )$ is defined the same as the $V_{p^t,q^t}( )$, and $V_{p^t,q^t}(f_S(p^t),f_S(q^t))$ denotes the cost at which adjacent data points $p^t$ and $q^t$ are classified as $f_S(p^t)$ and $f_S(q^t)$.

In one embodiment, the first point cloud frame $F^1$ is taken as the point cloud frame to be divided, in step S140, the point cloud in the first point cloud frame $F^1$ can be divided into a lamina point cloud block and a stem point cloud block according to steps S410, S420, S320 and S330, and during calculation, calculation of $D_{p^t}(L)$ and $D_{p^t}(S)$ applies to $|\{L_l\}|=0$ and $|\{S_s\}|=0$.

A system for dividing a plant organ point cloud, including:

a point cloud acquisition module, configured to acquire point cloud frames corresponding to multiple plant growth times of a monitored plant, and denote the acquired multiple point cloud frames as $F^1, \ldots, F^t, \ldots, F^n$ according to a sequence of the corresponding plant growth times;

a first point cloud frame dividing module, configured to divide a point cloud in the first point cloud frame $F^1$ into a lamina point cloud block and a stem point cloud block according to a flatness feature of a data point in the first point cloud frame $F^1$;

a scheduling module, configured to take $F^t$ ($2 \leq t \leq n$) successively in the point cloud frames $F^2$ to $F^n$ after the first point cloud frame according to a sequence of corresponding plant growth times, transfer the $F^t$ as a point cloud frame to be divided and a previous point cloud frame $F^{t-1}$ of the $F^t$ as an adjacent point cloud frame of the point cloud frame to be divided to a point cloud dividing module and start the point cloud dividing module;

the point cloud dividing module, configured to, according to information about a lamina point cloud block and a stem point cloud block in the adjacent point cloud frame of the point cloud frame to be divided and a flatness feature of a data point of the point cloud frame to be divided, divide the point cloud in the point cloud frame to be divided into a lamina point cloud block and a stem point cloud block;

a judgment module, configured to, after the point cloud dividing module divides the $F^t$, judge whether the number of the stem point cloud blocks contained in is larger than that of the stem point cloud blocks contained in $F^{t-1}$ or whether the number of the lamina point cloud blocks contained in is larger than that of the lamina point cloud blocks contained in $F^{t-1}$, if no, when t<n, notify the scheduling module to schedule the point cloud dividing module, to divide the point cloud in the next point cloud frame $F^{t+1}$ of $F^t$ into lamina point cloud blocks and stem point cloud blocks, when t=n, end, and if yes, schedule a backtracking control module; and the backtracking control module, configured to take $F^j$ ($1 \leq j \leq t-1$) successively in $F^{t-1}$ to $F^1$ according to a reverse sequence of corresponding plant growth times, transfer the $F^j$ as a point cloud frame to be divided and the next point cloud frame $F^{j+1}$ of the $F^j$ as an adjacent point cloud frame of the point cloud frame to be divided to the point cloud dividing module and start the point cloud dividing module, to redivide the point cloud in the point cloud frame before the $F^t$, until the number of the lamina point cloud blocks and the stem point cloud blocks of the redivided point cloud frame does not increase, and then stop starting the point cloud dividing module and notify the scheduling module to schedule the point cloud dividing module, to divide the point cloud in the next point cloud frame $F^{t+1}$ of $F^t$ into lamina point cloud blocks and stem point cloud blocks.

In one embodiment, the point cloud dividing module includes:

a data point classification module, configured to, according to the information about lamina point cloud blocks and stem point cloud blocks in the adjacent point cloud frame of the point cloud frame to be divided and the flatness feature of the data point in the point cloud frame to be divided, classify the data point in the point cloud frame to be divided as a lamina point or a stem point;

a lamina point cloud block aggregation module, configured to aggregate lamina points, which are connected with each other, in the point cloud frame to be divided to make up a lamina point cloud block;

a stem point cloud block aggregation module, configured to establish a minimum spanning tree of stem points in the point cloud frame to be divided, divide the minimum spanning tree into a separate branch that do not comprise forked stems, and map the stem points in the point cloud frame onto respective separate branches, to form respective stem point cloud blocks, wherein one separate branch corresponds to one stem point cloud block;

a separate organ point cloud block extraction module, configured to find out point cloud blocks, which have most overlapping data points, corresponding to each lamina point cloud block and each stem point cloud block in the point cloud frame to be divided and the adjacent point cloud frame, mark the corresponding point cloud blocks, and extract the lamina point cloud blocks and the stem point cloud blocks, which are marked less than twice, in the point cloud frame to be divided and the adjacent point cloud frame;

a lamina point cloud block redividing module, configured to classify the lamina points in the point cloud frame to be divided to categories corresponding to the lamina point cloud blocks extracted, and make the lamina points within the same category form one lamina point cloud block in the point cloud frame to be divided; and a stem point cloud block redividing module, configured to classify the stem points in the point cloud frame to be divided to categories corresponding to the lamina point cloud blocks extracted, and make the stem points within the same category form one stem point cloud block in the point cloud frame to be divided.

In one embodiment, the data point classification module includes:

a classification function solving unit, configured to solve to cause a target energy function to reach the least classification function, the target energy function being a function about a classification function, of which the function value denotes classification cost, and the classification function being a classification function that classifies data points of the point cloud frame to be divided into lamina points and stem points; and wherein a data point set in the point cloud frame to be divided is denoted as $P^t=\{p^t\}$ and a plant organ data point category set is denoted as $\{L, S\}$, wherein L represents a lamina point category, S represents a stem point set, $f_B$ is a classification function that maps $P^t$ to the set $\{L,S\}$, and the target energy function is as follows:

$$E(f_B) = \sum_{p^t \in P^t} D_{p^t}(f_B(p^t)) + \sum_{p^t,q^t \in N_{pt}} V_{p^t,q^t}(f_B(p^t), f_B(q^t))$$

wherein:
(1) $D_{p^t}(f_B(p^t))$ denotes the cost at which a data point of $p^t$ is classified as $f_B(p^t)$;

$$D_{p^t}(L) = \begin{cases} \max(R(p^t) - R(L_{i*}), O) & \text{if } |\{L_l\}| \neq 0 \text{ and } |\{S_s\}| \neq 0 \\ R(p^t) - \Re_L & \text{if } |\{L_l\}| = 0 \text{ or } |\{S_s\}| = 0 \end{cases}$$

$$D_{p^t}(S) = \begin{cases} \max(R(S_s) - R(p^t), O) & \text{if } |\{L_l\}| \neq 0 \text{ and } |\{S_s\}| \neq 0 \\ \Re_S - R(p^t) & \text{if } |\{L_l\}| = 0 \text{ or } |\{S_s\}| = 0 \end{cases}$$

$D_{p^t}(L)$ is the cost of $f_B(p^t)=L$, and $D_{p^t}(S)$ is the cost of $D_{p^t}(S)$, $R(p^t)$ is a flatness feature of $p^t$, $R(p^t)=\log(\max(C(p^t),c_\epsilon))$, $c_\epsilon$ is a preset constant greater than 0 and less than 1/3, $C(p^t)$ is a curvature feature of $p^t$, $C(p^t)=\lambda_1/(\lambda_1+\lambda_2+\lambda_3)$, wherein $\lambda_1$, $\lambda_2$ and $\lambda_3$ are eigenvalues obtained by principal component analysis on neighborhood points of $p^t$, and $\lambda_1 \leq \lambda_2$ and $\lambda_1 \leq \lambda_3$;

$\{L_l\}$ is a set of lamina point cloud blocks in an adjacent point cloud frame, $|\{L_l\}|$ is the number of $\{L_l\}$ elements, $L_{l*}$ is a lamina point cloud block, nearest the $p^t$, in $\{L_l\}$, and $R(L_{l*})$ is an average value of flatness features of data points in the $L_{l*}$; $\{S_s\}$ is a set of stem point cloud blocks in the adjacent point cloud frame, $|\{S_s\}|$ is the number of $\{S_s\}$ elements, $S_{s*}$ is a stem point cloud block, nearest the $p^t$, in $\{S_s\}$, and $R(S_{s*})$ is an average value of flatness features of data points in the $S_{s*}$;

$$\Re_L = \log(c_\epsilon), \Re_S = \log\left(\frac{1}{3}\right);$$

(2) $q^t$ is a data point adjacent to $p^t$ in $P^t$;
$N_{p^t}$ is a neighborhood system formed based on Delaunay triangulation on $P^t$ and removal of sides greater than a threshold $\epsilon$;
$V_{p^t,q^t}(f_B(p^t),f_B(q^t))$ denotes the cost at which adjacent data points $p^t$ and $q^t$ are classified as $f_B(p^t)$ and $f_B(q^t)$, $$V_{p^t,q^t}(f_B(p^t), f_B(q^t)) = \begin{cases} \max\left(\frac{1}{C(p^t)}, \frac{1}{C(q^t)}\right), & \text{if } f(p^t) \neq f(q^t) \\ 0, & \text{if } f(p^t) = f(q^t) \end{cases}$$

wherein $(p^t,q^t) \in N_{p^t}$, $C(p^t)$ is a curvature feature of $p^t$, and $C(q^t)$ is a curvature feature of $q^t$; and a classification unit, configured to classify the data points in the point cloud frame to be divided as lamina points or stem points according to the classification function obtained through solving.

In one embodiment, the corresponding categories of the lamina point cloud blocks extracted are respectively denoted as $L_1, L_2, \ldots, L_m$, LP is a set of lamina points in the point cloud frame to be divided, and $f_L()$ is a lamina classification function that maps LP to $\{L_1, L_2, \ldots, L_m\}$; and the lamina point cloud block redividing module is configured to solve to cause the following lamina classification cost function $E(f_L)$ to reach the least lamina point classification function $f_L()$, and classify the lamina points in the point cloud frame to be divided to the categories corresponding to the lamina point cloud blocks extracted according to the lamina point classification function obtained through solving:

$$E(f_L) = \sum_{p^t \in LP} D_{p^t}(f_L(p^t)) + \sum_{p^t,q^t \in N_{L^t}} V_{p^t,q^t}(f_L(p^t), f_L(q^t))$$

wherein:
(1)

$$D_{p^t}(f_L(p^t))=d(p^t,f_L(p^t))$$

$D_{p^t}(f_L(p^t))$ denotes the cost at which a lamina point $p^t$ is classified to $f_L(p^t)$, and $d(p^t,f_L(p^t))$ denotes a distance from a data point $p^t$ to the nearest point in a target block $f_L(p^t)$;
(2)
$q^t$ is a data point adjacent to $p^t$ in LP;
$N_{L^t}$ is a neighborhood system formed based on Delaunay triangulation on LP and removal of sides greater than a threshold $\epsilon$; and
$V_{p^t,q^t}()$ is defined the same as the $V_{p^t,q^t}()$, and $V_{p^t,q^t}(f_L(p^t),f_L(q^t))$ denotes the cost at which adjacent data points $p^t$ and $q^t$ are classified as $f_L(p^t)$ and $f_L(q^t)$.

In one embodiment, the categories corresponding to the stem point cloud blocks extracted are respectively denoted as $S_1, S_2, \ldots, S_n$, SP is a set of stem points in the point cloud frame to be divided, and $f_S()$ is a stem classification function that maps SP to $\{S_1, S_2, \ldots, S_n\}$; and the stem point cloud block redividing module is configured to solve to cause the following stem classification cost function $E(f_S)$ to reach the least stem point classification function $f_S()$, and classify the stem points in the point cloud frame to be divided to the categories corresponding to the stem point cloud blocks extracted according to the stem point classification function obtained through solving:

$$E(f_S) = \sum_{p^t \in SP} D_{p^t}(f_S(p^t)) + \sum_{p^t,q^t \in N_{S^t}} V_{p^t,q^t}(f_S(p^t), f_S(q^t))$$

wherein:
(1)

$$D_{p^t}(f_S(p^t)) = \begin{cases} o(p^t) - O(f_S(p^t)) & \text{if } d(p^t, f_S(p^t)) \leq \Delta \\ Y & \text{if } d(p^t, f_S(p^t)) \geq \Delta \end{cases}$$

$D_{p^t}(f_S(p^t))$ denotes the cost at which a stem point $p^t$ is classified to $f_S(p^t)$, $o(p^t)$ is orientation information of $p^t$, $o(p^t)=(x,y,z)$, wherein x, y and z are diagonal elements of an eigenvector matrix obtained by principal component analysis on neighborhood points of $p^t$, $O(f_S(p^t))$ is an average value of orientation information of all stem points in a stem point cloud block corresponding to $f_S(p^t)$, $\Delta$ is a preset distance threshold, $\gamma$ is a preset penalty term, and $d(p^t, f_S(p^t))$ is a distance between $d(p^t, f_S(p^t))$ and the stem point cloud block corresponding to $f_S(p^t)$;

(2)

$q^t$ is a data point adjacent to $p^t$ in SP;

$N_{S^t}$ is a neighborhood system formed based on Delaunay triangulation on SP and removal of sides greater than a threshold $\epsilon$; and $V_{p^t,q^t}(\ )$ is defined the same as the $V_{p^t,q^t}(\ )$, and $V_{p^t,q^t}(f_S(p^t), f_S(q^t))$ denotes the cost at which adjacent data points $p^t$ and $q^t$ are classified as $f_S(p^t)$ and $f_S(q^t)$.

In one embodiment, the first point cloud frame dividing module is configured to take the first point cloud frame $F^1$ as the point cloud frame to be divided, classify the data point of $F^1$ as a lamina point or a stem point according to the processing procedures of the classification function solving unit and the classification unit, and divide the point cloud in $F^1$ into a lamina point cloud block and a stem point cloud block according to the processing procedures of the lamina point cloud block aggregation module and the stem point cloud block aggregation module, and when the classification function is solved according to the processing procedure of the classification function solving unit, calculation of $D_{p^t}(L)$ and $D_{p^t}(S)$ applies to $|\{L_l\}|=0$ and $|\{S_s\}|=0$.

According to the method and system for dividing a plant organ point cloud, point cloud frames corresponding to multiple plant growth times of a monitored plant are acquired, and the acquired point cloud frames are divided; according to information about lamina point cloud blocks and stem point cloud blocks in a previous adjacent point cloud frame of a point cloud frame to be divided and a flatness feature of a data point of the point cloud frame to be divided, a point cloud of the point cloud frame to be divided is divided into lamina point cloud blocks and stem point cloud blocks; taking the adjacent point cloud frame as a reference to divide the point cloud frame facilitates the divided organ in maintaining the consistency of time and space between adjacent point cloud frames, and improves the accuracy of plant organ division. Moreover, when a new lamina point cloud block or a stem point cloud block is discovered, the point cloud in the point cloud frame before the point cloud block to be divided is redivided through tracking back, until the number of the lamina point cloud blocks and the stem point cloud blocks of the redivided point cloud frame does not increase; when redividing, according to information about the lamina point cloud blocks and the stem point cloud blocks in the next adjacent point cloud frame of the new lamina point cloud block or stem point cloud block which is discovered, the point cloud frame to be redivided is divided; and the redivision during tracking back facilitates extracting, from the point cloud frame, a new lamina point cloud block or a stem point cloud block which was not discovered in the previous division process, thereby further improving the accuracy of plant organ division.

DETAILED DESCRIPTION

Figure 1:
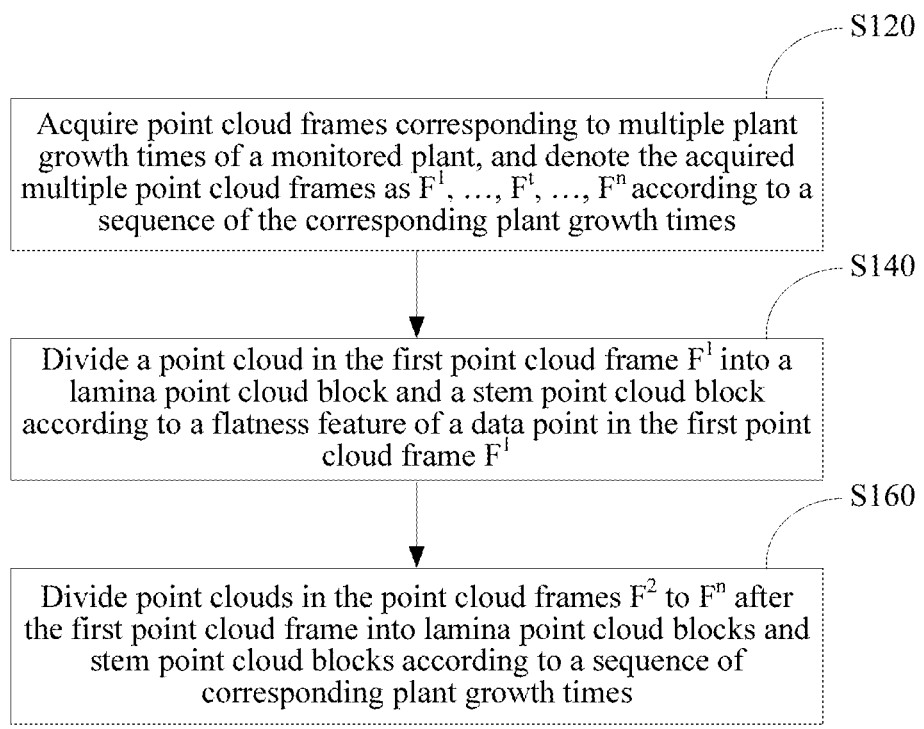
FIG. 1 is a schematic flowchart of a method for dividing a plant organ point cloud in one embodiment.

As shown in FIG. 1, a method for dividing a plant organ point cloud, including the following steps S120-S160:

S120: Acquire point cloud frames corresponding to multiple plant growth times of a monitored plant, and denote the acquired multiple point cloud frames as $F^1, \ldots, F^t, \ldots, F^n$ according to a sequence of the corresponding plant growth times.

S140: Divide a point cloud in the first point cloud frame $F^1$ into a lamina point cloud block and a stem point cloud block according to a flatness feature of a data point in the first point cloud frame $F^1$. The detailed process of step S140 is described hereinafter.

S160: Divide point clouds in the point cloud frames $F^2$ to $F^n$ after the first point cloud frame into lamina point cloud blocks and stem point cloud blocks according to a sequence of corresponding plant growth times.

Figure 2:
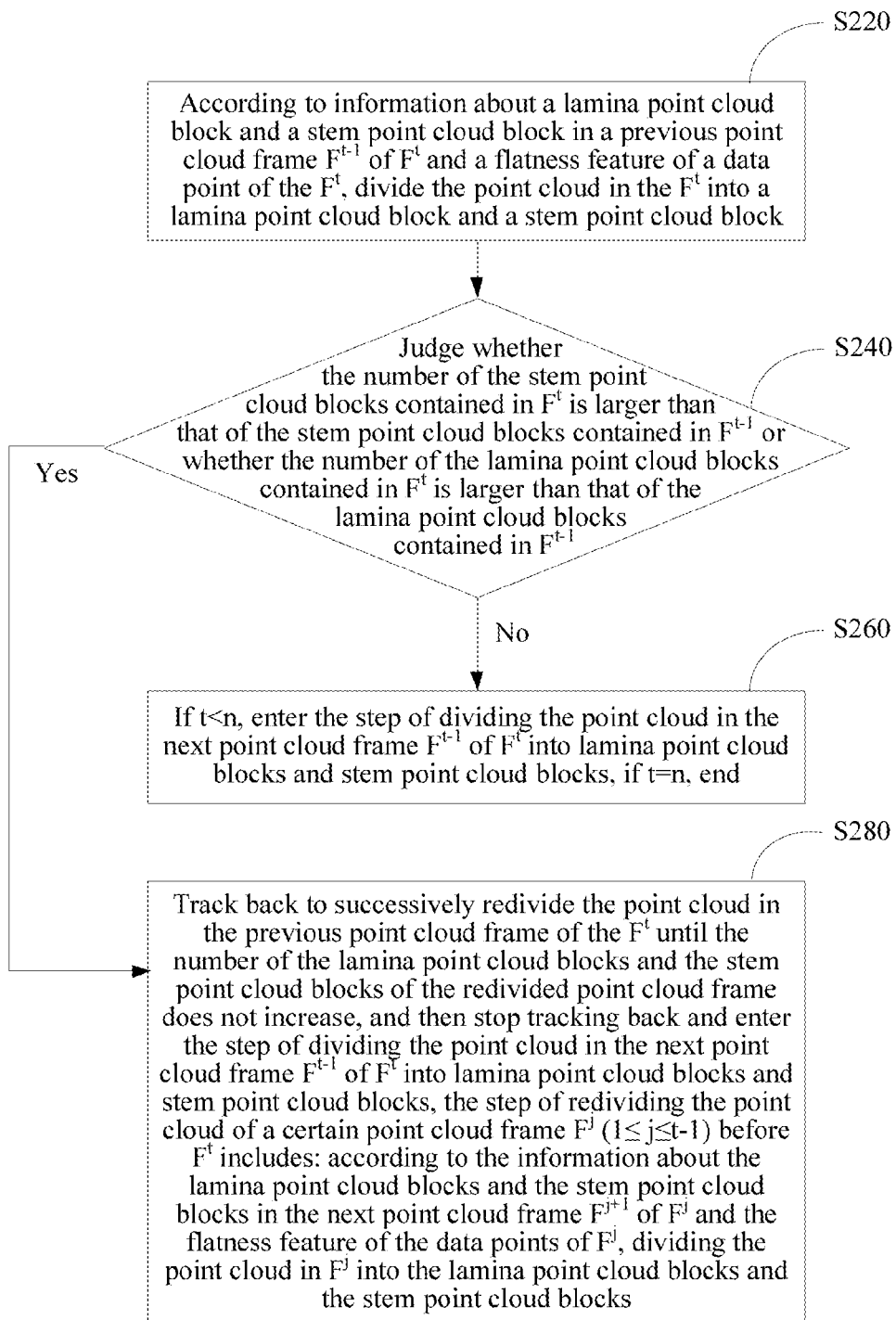
FIG. 2 is a schematic flowchart of the step of dividing a point cloud in a certain point cloud frame $F^t$ into a lamina point cloud block and a stem point cloud block in step S160 in FIG. 1 in one embodiment.

As shown in FIG. 2, the step of dividing a point cloud in a certain point cloud frame $F^t$ ($2 \leq t \leq n$) into a lamina point cloud block and a stem point cloud block in step S160 includes the following steps S220-S280:

S220: According to information about a lamina point cloud block and a stem point cloud block in a previous point cloud frame $F^{t-1}$ of $F^t$ and a flatness feature of a data point of the $F^t$, divide the point cloud in the $F^t$ into a lamina point cloud block and a stem point cloud block.

S240: Judge whether the number of the stem point cloud blocks contained in $F^t$ is larger than that of the stem point cloud blocks contained in $F^{t-1}$ or whether the number of the lamina point cloud blocks contained in $F^t$ is larger than that of the lamina point cloud blocks contained in $F^{t-1}$, if no, perform step S260, and if yes, perform step S280.

S260: If $t<n$, enter the step of dividing the point cloud in the next point cloud frame $F^{t+1}$ of $F^t$ into lamina point cloud blocks and stem point cloud blocks, if $t=n$, end.

S280: Track back to successively redivide the point cloud in the previous point cloud frame of the $F^t$ until the number of the lamina point cloud blocks and the stem point cloud blocks of the redivided point cloud frame does not increase, and then stop tracking back and enter the step of dividing the point cloud in the next point cloud frame $F^{t+1}$ of $F^t$ into lamina point cloud blocks and stem point cloud blocks.

The step of redividing the point cloud of a certain point cloud frame $F^j$ ($1 \leq j \leq t-1$) before $F^t$ in step S280 includes step S282: according to the information about the lamina point cloud blocks and the stem point cloud blocks in the next point cloud frame $F^{j+1}$ of $F^j$ and the flatness feature of the data points of $F^j$, divide the point cloud in $F^j$ into the lamina point cloud blocks and the stem point cloud blocks.

Figure 3:
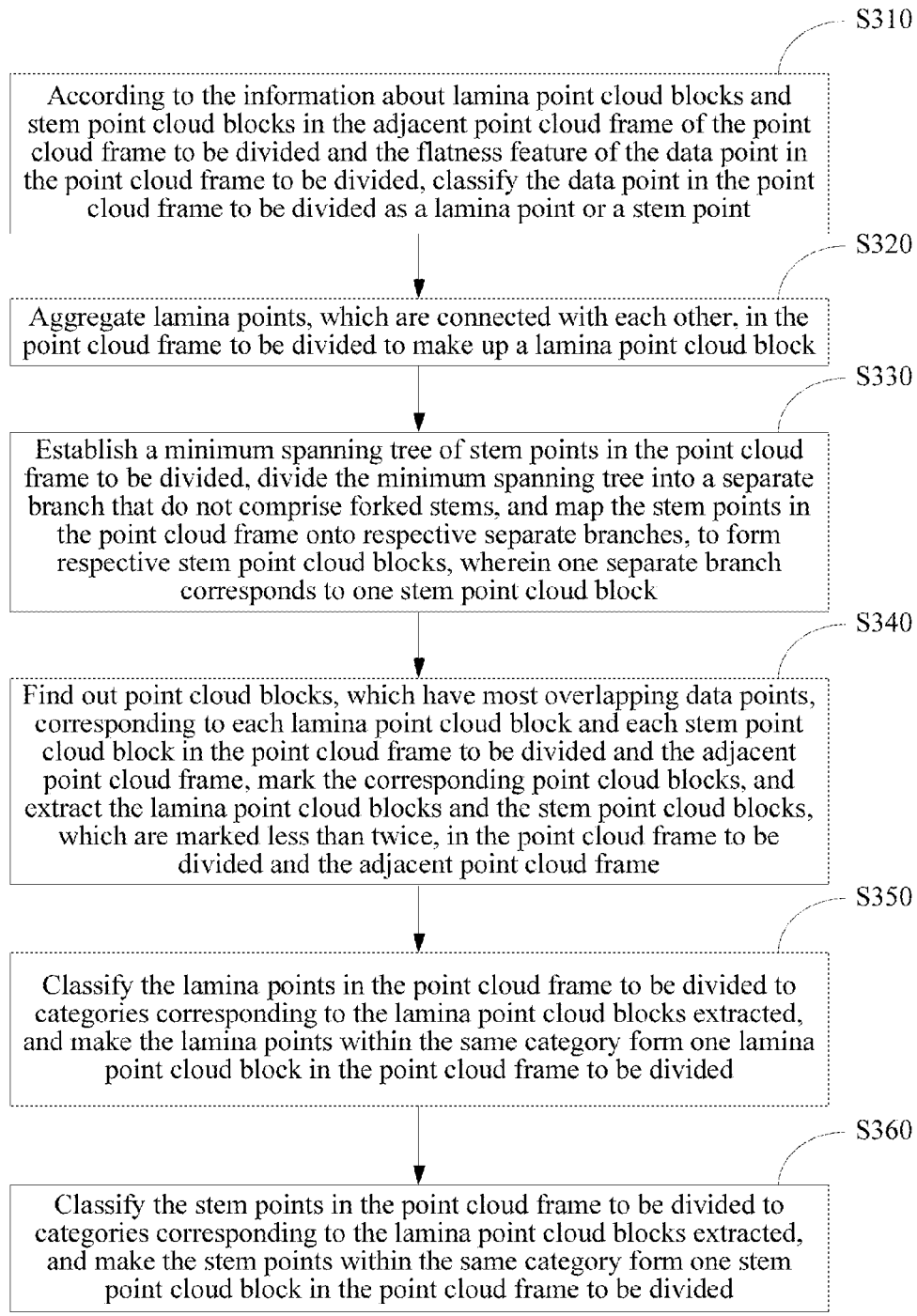
FIG. 3 is a schematic flowchart of the step of, according to information about lamina point cloud blocks and stem point cloud blocks in an adjacent point cloud frame of a point cloud frame to be divided and a flatness feature of a data point of the point cloud frame to be divided, dividing a point cloud of the point cloud frame to be divided into lamina point cloud blocks and stem point cloud blocks in one embodiment.

In one embodiment, if the $F^t$ in step S220 is denoted as a point cloud frame to be divided, the $F^{t-1}$ is denoted as an adjacent point cloud frame of the point cloud frame to be divided and the $F^j$ in step S282 is denoted as a point cloud frame to be divided, and the $F^{j+1}$ is denoted as an adjacent point cloud frame of the point cloud frame to be divided, the step of, according to information about lamina point cloud blocks and stem point cloud blocks in an adjacent point cloud frame of a point cloud frame to be divided and a flatness feature of a data point of the point cloud frame to be divided, dividing a point cloud of the point cloud frame to be divided into lamina point cloud blocks and stem point cloud blocks includes the following steps S310-S360, as shown in FIG. 3:

S310: According to the information about lamina point cloud blocks and stem point cloud blocks in the adjacent point cloud frame of the point cloud frame to be divided and the flatness feature of the data point in the point cloud frame to be divided, classify the data point in the point cloud frame to be divided as a lamina point or a stem point.

Figure 4:
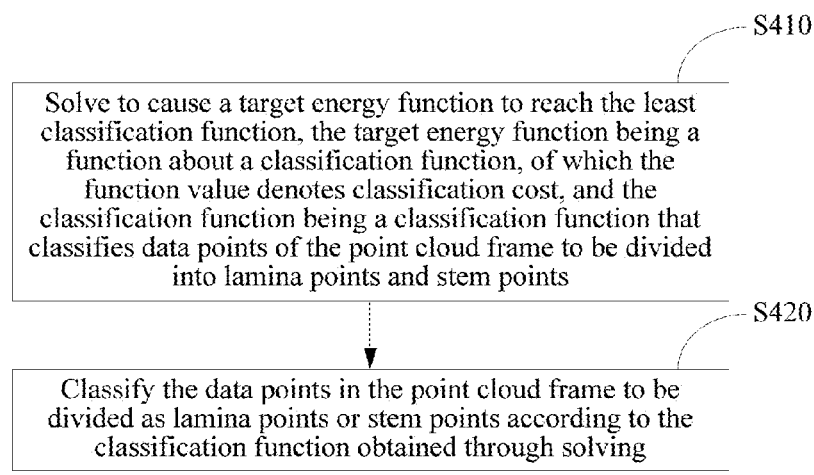
FIG. 4 is a schematic flowchart of step S310 in FIG. 3 in one embodiment.

As shown in FIG. 4, in one embodiment, step S310 includes the following steps S410 and S420:

S410: Solve to cause a target energy function to reach the least classification function, the target energy function being a function about a classification function, of which the function value denotes classification cost, and the classification function being a classification function that classifies data points of the point cloud frame to be divided into lamina points and stem points.

A data point set in the point cloud frame to be divided is denoted as $P^t=\{p^t\}$ and a plant organ data point category set is denoted as $\{L,S\}$, wherein L represents a lamina point category, S represents a stem point set, $f_B$ is a classification function that maps $P^t$ to the set $\{L,S\}$, and the target energy function is as follows:

$$E(f_B) = \sum_{p^t \in P^t} D_{p^t}(f_B(p^t)) + \sum_{p^t, q^t \in N_{p^t}} V_{p^t, q^t}(f_B(p^t), f_B(q^t))$$

wherein:

(1) $D_{p^t}(f_B(p^t))$ denotes the cost at which a data point of $p^t$ is classified as $f_B(p^t)$;

$$D_{p^t}(L) = \begin{cases} \max(R(p^t) - R(L_{i*}), 0) & \text{if } |\{L_l\}| \neq 0 \text{ and } |\{S_s\}| \neq 0 \\ R(p^t) - \mathfrak{R}_L & \text{if } |\{L_l\}| = 0 \text{ or } |\{S_s\}| = 0 \end{cases}$$

$$D_{p^t}(S) = \begin{cases} \max(R(S_s) - R(p^t), 0) & \text{if } |\{L_l\}| \neq 0 \text{ and } |\{S_s\}| \neq 0 \\ \mathfrak{R}_S - R(p^t) & \text{if } |\{L_l\}| = 0 \text{ or } |\{S_s\}| = 0 \end{cases}$$

$D_{p^t}(L)$ is the cost of $f_B(p^t)=L$, and $D_{p^t}(S)$ is the cost of $D_{p^t}(S)$, $R(p^t)$ is a flatness feature of $p^t$, $R(p^t)=\log(\max(C(p^t), c_\epsilon))$, $c_\epsilon$ is a preset constant greater than 0 and less than ⅓, $C(p^t)$ is a curvature feature of $p^t$, $C(p^t)=\lambda_1/(\lambda_1+\lambda_2+\lambda_3)$, wherein $\lambda_1$, $\lambda_2$ and $\lambda_3$ are eigenvalues obtained by principal component analysis on neighborhood points of $p^t$, and $\lambda_1 \leq \lambda_2$ and $\lambda_1 \leq \lambda_3$;

$$\mathfrak{R}_L = \log(c_\epsilon), \mathfrak{R}_S = \log\left(\frac{1}{3}\right);$$

$\{L_l\}$ is a set of lamina point cloud blocks in an adjacent point cloud frame, $|\{L_l\}|$ is the number of $\{L_l\}$ elements, $L_{l*}$ is a lamina point cloud block, nearest the $p^t$, in $\{L_l\}$, and $R(L_{l*})$ is an average value of flatness features of data points in the $L_{l*}$; $\{S_s\}$ is a set of stem point cloud blocks in the adjacent point cloud frame, $|\{S_s\}|$ is the number of $\{S_s\}$ elements, $S_{s*}$ is a stem point cloud block, nearest the $p^t$, in $\{S_s\}$, and $R(S_{s*})$ is an average value of flatness features of data points in the $S_{s*}$.

Developed laminas are usually relatively flat, and curvature features $C(p^t)$ corresponding to data points $p^t$ of the developed lamina all have a smaller value; therefore, stems and developed laminas can be distinguished from point clouds effectively through $C(p^t)$. $C(p^t)$ is distributed to $$\left[0, \frac{1}{3}\right],$$

however, the values thereof do not linearly correspond to flatness of the point clouds; to solve this problem, in the present invention, $C(p^t)$ particularly approximate to 0 is taken as a constant $c_\epsilon$ not 0 (reference value: 0.015) to avoid that the value of $C(p^t)$ has multiple differences in magnitude, then a log function is used to convert it to a flatness feature $R(p^t)$, $R(p^t)=\log(\max(C(p^t), c_\epsilon))$ is defined, and $$\mathfrak{R}_L = \log(c_\epsilon) \text{ and } \mathfrak{R}_S = \log\left(\frac{1}{3}\right)$$

are defined; and then $R(p^t)$ will be distributed to $[\mathfrak{R}_L, \mathfrak{R}_S]$. The distance from $R(p^t)$ to $\mathfrak{R}_L$ and $\mathfrak{R}_S$ measures the cost at which the data points $p^t$ are classified as laminas or stems.

Therefore, in the formula, if $|\{L_l^{t\pm 1}\}|=0$ or $|\{S_s^{t\pm 1}\}|=0$, $D_{p^t}(L)=R(p^t)-\mathfrak{R}_L$ and $D_{p^t}(S)=\mathfrak{R}_S-R(p^t)$.

However, the degree of differentiation between lamina point cloud features and stem point cloud features at the beginning of growth of plants is subtle, a flatness value of a lamina may seriously approximate $R_S$ and thus is to be wrongly judged as a stem, and only the degree of differentiation between point cloud features of mature laminas and point cloud features of stems is obvious. $D_{p^t}(f_B(p^t))$ defined with global absolute values $R_S$ and $R_L$ cannot adapt to different phases of development of a plant organ, and to ensure precise plant organ classification, it is necessary to use flatness features of point cloud blocks in adjacent point cloud frames during classification of data points, instead of the global absolute values $R_S$ and $R_L$.

Therefore, in the formula, if $|\{L_l^{t\pm 1}\}| \neq 0$ and $|\{S_s^{t\pm 1}\}| \neq 0$, $D_{p^t}(L)=\max(R(p^t)-R(L_{l*}^{t\pm 2}),0)$ and $D_{p^t}(S)=\max(R(S_{s*}^{t\pm 1})-R(p^t),0)$.

It is often difficult to accurately divide plant organs at the beginning of development of the plant organs, in the present invention, in step S220, accurate organ division can be performed on point clouds of mature plants. Further, based on the accurate organ division on point clouds of mature plants, in step S282, when tracking back to re-perform organ division on point clouds of plants at the beginning of development, accuracy of organ division on point clouds of plants at the beginning of development can be improved.

(2) $q^t$ is a data point adjacent to $p^t$ in $P^t$;

$N_{p^t}$ is a neighborhood system formed based on Delaunay triangulation on $P^t$ and removal of sides greater than a threshold $\epsilon$; in one embodiment, $\epsilon=3$ mm.

$V_{p^t,q^t}(f_B(p^t),f_B(q^t))$ denotes the cost at which adjacent data points $p^t$ and $q^t$ are classified as $f_B(p^t)$ and $f_B(q^t)$, $$V_{p^t,q^t}(f_B(p^t), f_B(q^t)) = \begin{cases} \max\left(\dfrac{1}{C(p^t)}, \dfrac{1}{C(q^t)}\right), & \text{if } f(p^t) \neq f(q^t) \\ 0, & \text{if } f(p^t) = f(q^t) \end{cases}$$

wherein $(p^t,q^t) \in N_{p^t}$, $C(p^t)$ is a curvature feature of $p^t$, and $C(q^t)$ is a curvature feature of $q^t$.

There is strong correlation between curvature features of data points and an organ adjacency region: a data point at the organ adjacency region usually has a greater curvature. The cost at which $V_{p^t,q^t}(f_B(p^t),f_B(q^t))$ divides adjacent data points into different categories at different kinds of organ adjacency regions is smaller, which can make the data points at different kinds of organ adjacency regions divided into different categories as much as possible, while the cost at which adjacent data points of the same organ are divided into different categories is greater, so as to ensure smoothness of classification.

The target energy function is a typical Markov Random Fields question, and the graph cut algorithm can be used for approximate solution.

S420: Classify the data points in the point cloud frame to be divided as lamina points or stem points according to the classification function obtained through solving.

Specifically, if the target energy function reaches the smallest classification function to map a certain data point in the point cloud frame to be divided to L, the data point is classified as a lamina point; if the classification function maps the data point to S, the data point is classified as a stem point.

S320: Aggregate lamina points, which are connected with each other, in the point cloud frame to be divided to make up a lamina point cloud block.

S330: Establish a minimum spanning tree of stem points in the point cloud frame to be divided, divide the minimum spanning tree into a separate branch that do not comprise forked stems, and map the stem points in the point cloud frame onto respective separate branches, to form respective stem point cloud blocks, wherein one separate branch corresponds to one stem point cloud block.

Before establishment of a minimum spanning tree of stem points in the point cloud frame to be divided, preset processing can be performed on the stem points in the point cloud frame to be divided at first. Specifically, a preset proportion (e.g., 10%) of stem points in the point cloud frame to be divided are sampled to obtain sampling points, and the sampling points are projected to the center where the sampling points are adjacent to the data points to gather the sampling points together onto a stem centerline, to screen out one sampling points in two sampling points between which the distance is less than a preset value. In step S330, the minimum spanning tree can be established according to the remaining sampling points.

Further, nodes whose degrees are greater than 2 in the minimum spanning tree can be deleted, to cause stems of the minimum spanning tree to be disconnected at the deleted nodes, so as to generate separate branches not containing forked stems. Further, the separate branches shorter than a threshold can be deleted.

S340: Find out point cloud blocks, which have most overlapping data points, corresponding to each lamina point cloud block and each stem point cloud block in the point cloud frame to be divided and the adjacent point cloud frame, mark the corresponding point cloud blocks, and extract the lamina point cloud blocks and the stem point cloud blocks, which are marked less than twice, in the point cloud frame to be divided and the adjacent point cloud frame.

In one embodiment, it is feasible to start from each lamina point cloud block of the point cloud frame to be divided and the adjacent point cloud frame, find out, in the other point cloud frame of the two point cloud frames other than the point cloud frame where the lamina point cloud block is, a lamina point cloud block overlapping with the point cloud frame to the greatest extent, mark one outgoing edge from the lamina point cloud block to the lamina point cloud block overlapping therewith to the greatest extent, and then screen out all lamina point cloud blocks whose in-degree is greater than 2.

Figure 5:
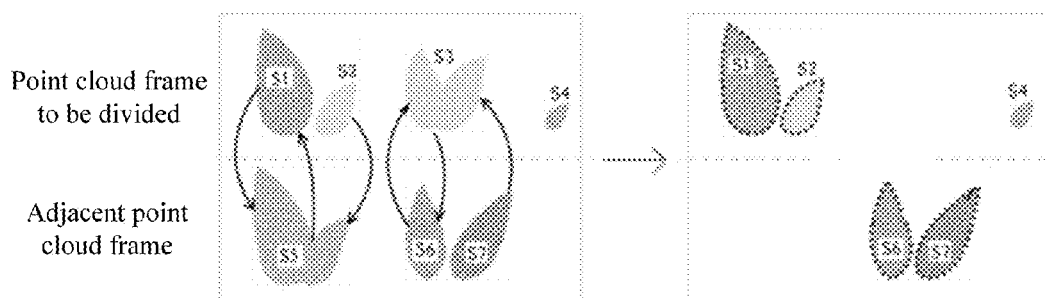
FIG. 5 is a schematic view of extracting separate lamina point cloud from a point cloud frame to be divided and an adjacent point cloud frame in one embodiment.

FIG. 5 is a schematic view of extracting separate lamina point cloud from a point cloud frame to be divided and an adjacent point cloud frame in one embodiment. As shown in FIG. 5, the point cloud frame to be divided and the adjacent point cloud frame include lamina point cloud blocks S1, S2, S3, S4, S5, S6 and S7. The lamina point cloud block overlapping with S1 to the greatest extent is S5, and one outgoing edge from S1 to S5 is marked; the lamina point cloud block overlapping with S2 to the greatest extent is also S5, and one outgoing edge from S2 to S5 is marked; the lamina point cloud block overlapping with S5 to the greatest extent is also S1, and one outgoing edge from S5 to S1 is marked; and other lamina point cloud blocks are marked by analogy. Finally, the lamina point cloud blocks whose in-degree is greater than 2 are S3 and S5, S3 and S5 are deleted, and S1, S2, S4, S6 and S7 are left. The remaining lamina point cloud blocks all include single separate laminas.

S350: Classify the lamina points in the point cloud frame to be divided to categories corresponding to the lamina point cloud blocks extracted, and make the lamina points within the same category form one lamina point cloud block in the point cloud frame to be divided.

A distance between a lamina point and a lamina point cloud block is a distance between the lamina point and the nearest data point in the lamina point cloud block.

Specifically, the corresponding categories of the lamina point cloud blocks extracted are respectively denoted as $L_1, L_2, \ldots, L_m$, LP is a set of lamina points in the point cloud frame to be divided, and $f_L(\ )$ is a lamina classification function that maps LP to $\{L_1, L_2, \ldots, L_m\}$.

The step of classifying the lamina points in the point cloud frame to be divided to categories corresponding to the lamina point cloud blocks extracted in step S350 is: solving to cause the following lamina classification cost function $E(f_L)$ to reach the least lamina point classification function $f_L(\ )$, and classifying the lamina points in the point cloud frame to be divided to the categories corresponding to the lamina point cloud blocks extracted according to the lamina point classification function obtained through solving:

$$E(f_L) = \sum_{p^t \in LP} D_{p^t}(f_L(p^t)) + \sum_{p^t,q^t \in N_{L^t}} V_{p^t,q^t}(f_L(p^t), f_L(q^t))$$

wherein:

(1)

$$D_{p^t}(f_L(p^t)) = d(p^t, f_L(p^t))$$

$D_{p^t}(f_L(p^t))$ denotes the cost at which a lamina point $p^t$ is classified to $f_L(p^t)$, and $d(p^t, f_L(p^t))$ denotes a distance from a data point $p^t$ to the nearest point in a target block $f_L(p^t)$;

(2)

$q^t$ is a data point adjacent to $p^t$ in LP;

$N_{L^t} = \{(p^t, q^t)\} = \{(p^t, q^t \in \text{Delaunay}(P^t) : |p^t - q^t| < \epsilon\}$, $N_{L^t}$ is a neighborhood system formed based on Delaunay triangulation on LP and removal of sides greater than a threshold $\epsilon$; and $V_{p^t, q^t}(\ )$ is defined the same as the $V_{p^t, q^t}(\ )$, and $V_{p^t, q^t}(f_L(p^t), f_L(q^t))$ denotes the cost at which adjacent data points $p^t$ and $q^t$ are classified as $f_L(p^t)$ and $f_L(q^t)$.

S360: Classify the stem points in the point cloud frame to be divided to categories corresponding to the lamina point cloud blocks extracted, and make the stem points within the same category form one stem point cloud block in the point cloud frame to be divided.

In one embodiment, the categories corresponding to the stem point cloud blocks extracted are respectively denoted as $S_1, S_2, \ldots, S_n$, SP is a set of stem points in the point cloud frame to be divided, and $f_S(\ )$ is a stem classification function that maps SP to $\{S_1, S_2, \ldots, S_n\}$; and the step of classifying the stem points in the point cloud frame to be divided to categories corresponding to the stem point cloud blocks extracted in step S360 is: solving to cause the following stem classification cost function $E(f_S)$ to reach the least stem point classification function $f_S(\ )$, and classifying the stem points in the point cloud frame to be divided to the categories corresponding to the stem point cloud blocks extracted according to the stem point classification function obtained through solving:

$$E(f_s) = \sum_{p^t \in sp} D_{p^t}(f_s(p^t)) + \sum_{p^t, q^t \in N_{s^t}} V_{p^t, q^t}(f_s(p^t), f_s(q^t))$$

wherein:

(1)

$$D_{p^t}(f_s(p^t)) = \begin{cases} o(p^t) - O(f_s(p^t)) & \text{if } d(p^t, f_s(p^t)) \leq \Delta \\ \gamma & \text{if } d(p^t, f_s(p^t)) \geq \Delta \end{cases}$$

$D_{p^t}(f_S(p^t))$ denotes the cost that classifies a stem point $p^t$ to $f_S(p^t)$, $o(p^t)$ is orientation information of $p^t$, $o(p^t) = (x, y, z)$, wherein x, y and z are diagonal elements of an eigenvector matrix obtained by principal component analysis on neighborhood points of $p^t$, $O(f_S(p^t))$ is an average value of orientation information of all stem points in a stem point cloud block corresponding to $f_S(p^t)$, $\Delta$ is a preset distance threshold, $\gamma$ is a preset penalty term, and $d(p^t, f_S(p^t))$ is a distance between $d(p^t, f_S(p^t))$ and the stem point cloud block corresponding to $f_S(p^t)$;

(2)

$q^t$ is a data point adjacent to $p^t$ in SP;

$N_{S^t} = \{(p^t, q^t)\} = \{(p^t, q^t \in \text{Delaunay}(P^t) : |p^t - q^t| < \epsilon\}$, $N_{S^t}$ is a neighborhood system formed based on Delaunay triangulation on SP and removal of sides greater than a threshold E; and $V_{p^t, q^t}(\ )$ is defined the same as the $V_{p^t, q^t}(\ )$, and $V_{p^t, q^t}(f_S(p^t), f_S(q^t))$ denotes the cost that classifies adjacent data points $p^t$ and $q^t$ as $f_S(p^t)$ and $f_S(q^t)$.

In the documents of the present application, the distance between a data point and a point cloud block refers to a distance between the data point and the nearest data point in the point cloud block.

In one embodiment, the first point cloud frame $F^1$ is taken as the point cloud frame to be divided, in step S140, the point cloud in the first point cloud frame $F^1$ can be divided into a lamina point cloud block and a stem point cloud block according to steps S410, S420, S320 and S330, and during calculation, calculation of $D_{p^t}(L)$ and $D_{p^t}(S)$ applies to $|\{L_l\}|=0$ and $|\{S_s\}|=0$.

According to the method for dividing a plant organ point cloud, point cloud frames corresponding to multiple plant growth times of a monitored plant are acquired, and the acquired point cloud frames are divided; according to information about lamina point cloud blocks and stem point cloud blocks in a previous adjacent point cloud frame of a point cloud frame to be divided and a flatness feature of a data point of the point cloud frame to be divided, a point cloud of the point cloud frame to be divided is divided into lamina point cloud blocks and stem point cloud blocks; taking the adjacent point cloud frame as a reference to divide the point cloud frame facilitates the divided organ in maintaining the consistency of time and space between adjacent point cloud frames, and improves the accuracy of plant organ division. Moreover, when a new lamina point cloud block or a stem point cloud block is discovered, the point cloud in the point cloud frame before the point cloud block to be divided is redivided through tracking back, until the number of the lamina point cloud blocks and the stem point cloud blocks of the redivided point cloud frame does not increase; when redividing, according to information about the lamina point cloud blocks and the stem point cloud blocks in the next adjacent point cloud frame of the new lamina point cloud block or stem point cloud block, the point cloud frame to be redivided is divided; and the redivision during tracking back facilitates extracting, from the point cloud frame, a new lamina point cloud block or a stem point cloud block which was not discovered in the previous division process, thereby further improving the accuracy of plant organ division.

Figure 6:
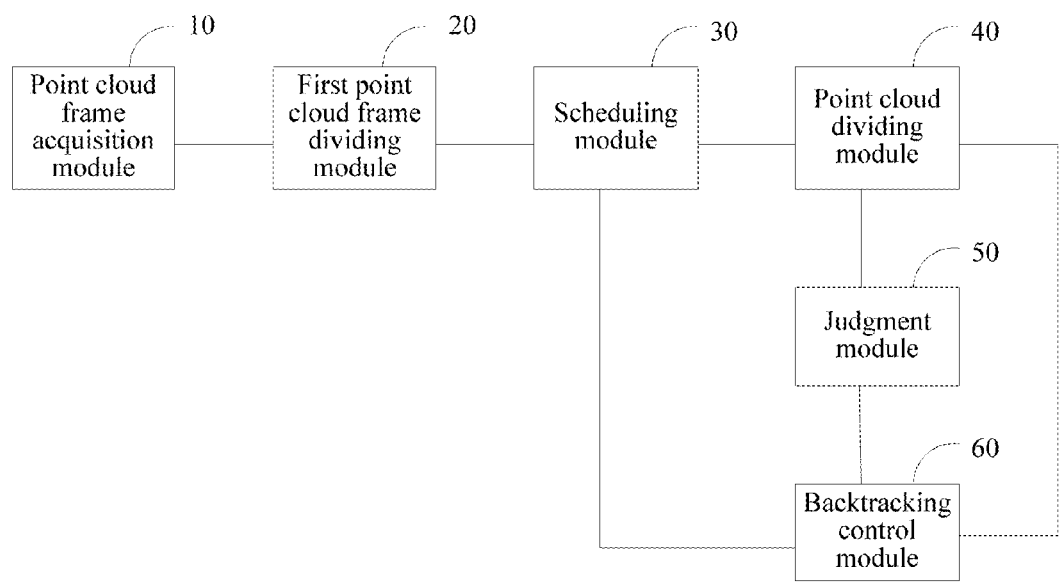
FIG. 6 is a schematic structural view of a system for dividing a plant organ point cloud in one embodiment.

As shown in FIG. 6, a system for dividing a plant organ point cloud includes a point cloud frame acquisition module 10, a first point cloud frame dividing module 20, a scheduling module 30, a point cloud dividing module 40, a judgment module 50 and a backtracking control module 60, wherein:

The point cloud frame acquisition module 10 is configured to acquire point cloud frames corresponding to multiple plant growth times of a monitored plant, and denote the acquired multiple point cloud frames as $F^1, \ldots, F^t, \ldots, F^n$ according to a sequence of the corresponding plant growth times.

The first point cloud frame dividing module 20 is configured to divide a point cloud in the first point cloud frame $F^1$ into a lamina point cloud block and a stem point cloud block according to a flatness feature of a data point in the first point cloud frame $F^1$. The processing procedure of the first point cloud frame dividing module 20 is described hereinafter.

The scheduling module 30 is configured to take $F^t$ ($2 \leq t \leq n$) successively in the point cloud frames $F^2$ to $F^n$ after the first point cloud frame according to a sequence of corresponding plant growth times, transfer the $F^t$ as a point cloud frame to be divided and a previous point cloud frame $F^{t-1}$ of the $F^t$ as an adjacent point cloud frame of the point cloud frame to be divided to a point cloud dividing module and start the point cloud dividing module.

The point cloud dividing module 40 is configured to, according to information about a lamina point cloud block and a stem point cloud block in the adjacent point cloud frame of the point cloud frame to be divided and a flatness feature of a data point of the point cloud frame to be divided, divide the point cloud in the point cloud frame to be divided into a lamina point cloud block and a stem point cloud block.

The judgment module 50 is configured to, after the point cloud dividing module 40 divides the $F^t$, judge whether the number of the stem point cloud blocks contained in $F^t$ is larger than that of the stem point cloud blocks contained in $F^{t-1}$ or whether the number of the lamina point cloud blocks contained in $F^t$ is larger than that of the lamina point cloud blocks contained in $F^{t-1}$, if no, when t<n, notify the scheduling module 30 to schedule the point cloud dividing module 40, to divide the point cloud in the next point cloud frame $F^{t+1}$ of $F^t$ into lamina point cloud blocks and stem point cloud blocks, when t=n, end, and if yes, schedule a backtracking control module 60.

The backtracking control module 60 is configured to take $F^j$ (1≤j≤t−1) successively in $F^{t-1}$ to $F^1$ according to a reverse sequence of corresponding plant growth times, transfer the $F^j$ as a point cloud frame to be divided and the next point cloud frame $F^{j+1}$ of the $F^j$ as an adjacent point cloud frame of the point cloud frame to be divided to the point cloud dividing module and start the point cloud dividing module 40, to redivide the point cloud in the point cloud frame before the $F^t$, until the number of the lamina point cloud blocks and the stem point cloud blocks of the redivided point cloud frame does not increase, and then stop starting the point cloud dividing module and notify the scheduling module 30 to schedule the point cloud dividing module 40, to divide the point cloud in the next point cloud frame $F^{t+1}$ of $F^t$ into lamina point cloud blocks and stem point cloud blocks.

Figure 7:
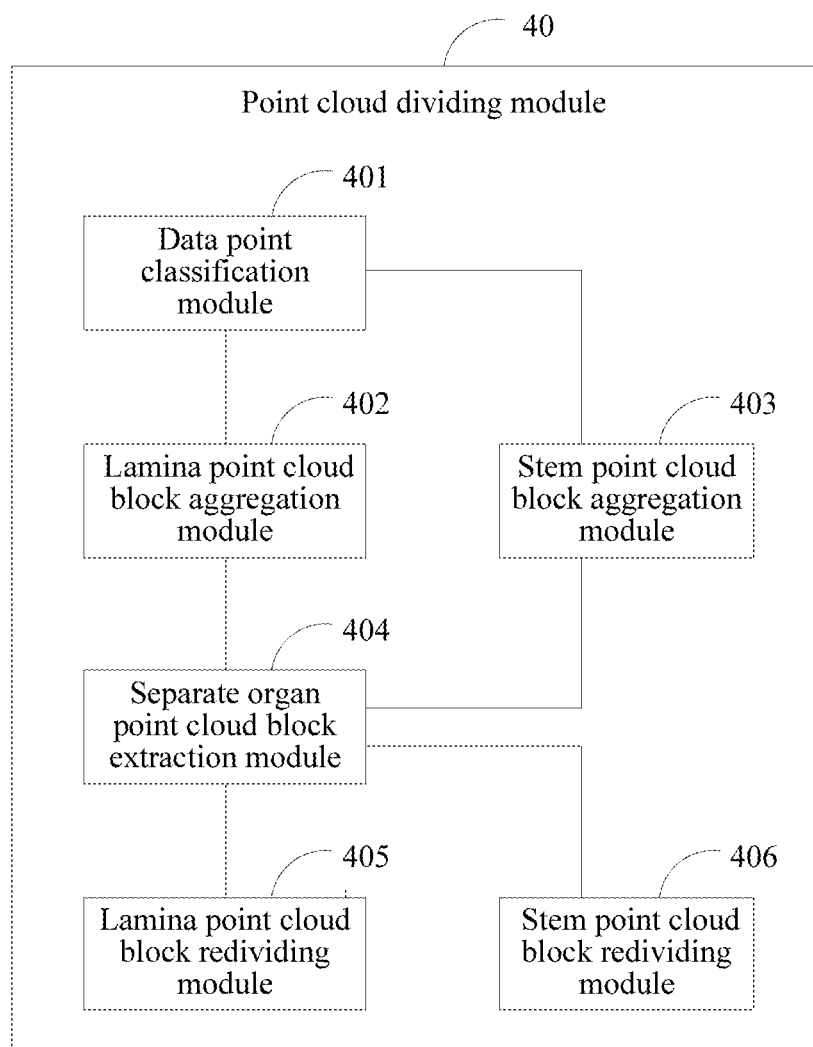
FIG. 7 is a schematic structural view of a point cloud dividing module in one embodiment.

As shown in FIG. 7, the point cloud dividing module 40 includes a data point classification module 401, a lamina point cloud block aggregation module 402, a stem point cloud block aggregation module 403, a separate organ point cloud block extraction module 404, a lamina point cloud block redividing module 405 and a stem point cloud block redividing module 406, wherein:

The data point classification module 401 is configured to, according to the information about lamina point cloud blocks and stem point cloud blocks in the adjacent point cloud frame of the point cloud frame to be divided and the flatness feature of the data point in the point cloud frame to be divided, classify the data point in the point cloud frame to be divided as a lamina point or a stem point.

Figure 8:
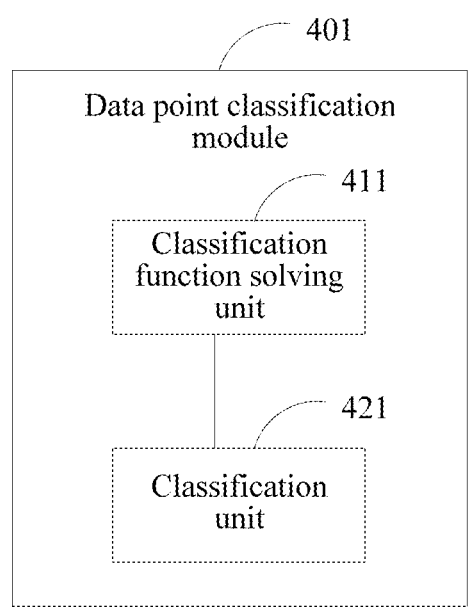
FIG. 8 is a schematic structural view of a data point classification module in one embodiment.

As shown in FIG. 8, in one embodiment, the data point classification module 401 includes a classification function solving unit 411 and a classification unit 421, wherein:

The solving unit 411 is configured to solve to cause a target energy function to reach the least classification function, the target energy function being a function about a classification function, of which the function value denotes classification cost, and the classification function being a classification function that classifies data points of the point cloud frame to be divided into lamina points and stem points.

A data point set in the point cloud frame to be divided is denoted as $P^t=\{p^t\}$ and a plant organ data point category set is denoted as $\{L,S\}$, wherein L represents a lamina point category, S represents a stem point set, $f_B$ is a classification function that maps $P^t$ to the set $\{L, S\}$, and the target energy function is as follows:

$$E(f_B) = \sum_{p^t \in p^t} D_{p^t}(f_B(p^t)) + \sum_{p^t, q^t \in N_{p^t}} V_{p^t, q^t}(f_B(p^t), f_B(q^t))$$

wherein:

(1) $D_{p^t}(f_B(p^t))$ denotes the cost that classifies a data point of $p^t$ as $f_B(p^t)$;

$$D_{p^t}(L) = \begin{cases} \max(R(p^t) - R(L_l), 0) & \text{if } |\{L_l\}| \neq 0 \text{ and } |\{S_s\}| \neq 0 \\ R(p^t) - \mathfrak{R}_L & \text{if } |\{L_l\}| = 0 \text{ or } |\{S_s\}| = 0 \end{cases}$$

$$D_{p^t}(S) = \begin{cases} \max(R(S_s) - R(p^t), 0), & \text{if } |\{L_l\}| \neq 0 \text{ and } |\{S_s\}| \neq 0 \\ \mathfrak{R}_S - R(p^t), & \text{if } |\{L_l\}| = 0 \text{ or } |\{S_s\}| = 0 \end{cases}$$

$D_{p^t}(L)$ is the cost of $f_B(p^t)=L$, and $D_{p^t}(S)$ is the cost of $D_{p^t}(S)$, $R(p^t)$ is a flatness feature of $p^t$, $R(p^t)=\log(\max(C(p^t),c_\epsilon))$, $c_\epsilon$ is a preset constant greater than 0 and less than 1/3, $C(p^t)$ is a curvature feature of $p^t$, $C(p^t)=\lambda_1/(\lambda_1+\lambda_2+\lambda_3)$, wherein $\lambda_1$, $\lambda_2$ and $\lambda_3$ are eigenvalues obtained by principal component analysis on neighborhood points of $p^t$, and $\lambda_1 \leq \lambda_2$ and $\lambda_1 \leq \lambda_3$;

$$\mathfrak{R}_L = \log(c_\epsilon), \mathfrak{R}_S = \log\left(\frac{1}{3}\right);$$

$\{L_l\}$ is a set of lamina point cloud blocks in an adjacent point cloud frame, $|\{L_l\}|$ is the number of $\{L_l\}$ elements, $L_{l*}$ is a lamina point cloud block, nearest the $p^t$, in $\{L_l\}$, and $R(L_{l*})$ is an average value of flatness features of data points in the $L_{l*}$: $\{S_s\}$ is a set of stem point cloud blocks in the adjacent point cloud frame, $|\{S_s\}|$ is the number of $\{S_s\}$ elements, $S_{s*}$ is a stem point cloud block, nearest the $p^t$, in $\{S_s\}$, and $R(S_{s*})$ is an average value of flatness features of data points in the $S_{s*}$.

Developed laminas are usually relatively flat, and curvature features $C(p^t)$ corresponding to data points $p^t$ of the developed lamina all have a smaller value; therefore, stems and developed laminas can be distinguished from point clouds effectively through $C(p^t)$. $C(p^t)$ is distributed to $$\left[0, \frac{1}{3}\right],$$

however, the values thereof do not linearly correspond to flatness of the point clouds; to solve this problem, in the present invention, $C(p^t)$ particularly approximate to 0 is taken as a constant $c_\epsilon$ not 0 (reference value: 0.015) to avoid that the value of $C(p^t)$ has multiple differences in magnitude, then a log function is used to convert it to a flatness feature $R(p^t)$, $R(p^t)=\log(\max(C(p^t),c_\epsilon))$ is defined, and $$\mathfrak{R}_L = \log(c_\epsilon) \text{ and } \mathfrak{R}_S = \log\left(\frac{1}{3}\right)$$

are defined; and then $R(p^t)$ will be distributed to $[\mathfrak{R}_L, \mathfrak{R}_S]$. The distance from $R(p^t)$ to $\mathfrak{R}_L$ and $\mathfrak{R}_S$ measures the cost at which the data points $p^t$ are classified as laminas or stems.

Therefore, in the formula, if $|\{L_l^{t\pm2}\}|=0$, or $|\{S_s^{t\pm1}\}|=0$, $D_{p^t}(L)=R(p^t)-\mathfrak{R}_L$ and $D_{p^t}(S)=\mathfrak{R}_S-R(p^t)$.

However, the degree of differentiation between lamina point cloud features and stem point cloud features at the beginning of growth of plants is subtle, a flatness value of a lamina may seriously approximate $R_S$ and thus is to be wrongly judged as a stem, and only the degree of differentiation between point cloud features of mature laminas and point cloud features of stems is obvious. $D_{p^t}(f_B(p^t))$ defined with global absolute values $R_S$ and $R_L$ cannot adapt to different phases of development of a plant organ, and to ensure precise plant organ classification, it is necessary to use flatness features of point cloud blocks in adjacent point cloud frames during classification of data points, instead of the global absolute values $R_S$ and $R_L$.

Therefore, in the formula, if $|\{L_l^{t\pm1}\}| \neq 0$ and $|\{S_s^{t\pm1}\}| \neq 0$, $D_{p^t}(L) = \max(R(p^t) - R(L_{l^*}^{t\pm1}), 0)$ and $D_{p^t}(S) = \max(R(S_{s^*}^{t\pm1}) - R(p^t), 0)$.

It is often difficult to accurately divide plant organs at the beginning of development of the plant organs, in the present invention, accurate organ division can be performed on point clouds of mature plants when the point cloud dividing module 40, according to information about a lamina point cloud block and a stem point cloud block in a previous adjacent point cloud frame of the point cloud frame to be divided and a flatness feature of a data point of the point cloud frame to be divided, divides the point cloud in the point cloud frame to be divided into a lamina point cloud block and a stem point cloud block. Further, based on the accurate organ division on point clouds of mature plants, when tracking back to re-perform organ division on point clouds of plants at the beginning of development, the point cloud dividing module 40, according to information about a lamina point cloud block and a stem point cloud block in next adjacent point cloud frame of the point cloud frame to be divided and the flatness feature of the data point of the point cloud frame to be divided, divides the point cloud in the point cloud frame to be divided into a lamina point cloud block and a stem point cloud block, which can thus improve accuracy of organ division on point clouds of plants at the beginning of development.

(2) $q^t$ is a data point adjacent to $p^t$ in $P^t$;

$N_{p^t} = \{(p^t, q^t)\} = \{(p^t, q^t) \in \text{Delaunay}(P^t) : |p^t - q^t| < \epsilon\}$ is a neighborhood system formed based on Delaunay triangulation on $P^t$ and removal of sides greater than a threshold $\epsilon$; in one embodiment, $\epsilon = 3$ mm.

$V_{p^t, q^t}(f_B(p^t), f_B(q^t))$ denotes the cost of classifying adjacent data points $p^t$ and $q^t$ as $f_B(p^t)$ and $f_B(q^t)$, $$V_{p^t,q^t}(f_B(p^t), f_B(q^t)) = \begin{cases} \max\left(\frac{1}{C(p^t)}, \frac{1}{C(q^t)}\right), & \text{if } f(p^t) \neq f(q^t) \\ 0, & \text{if } f(p^t) = f(q^t) \end{cases}$$

wherein $(p^t, q^t) \in N_{p^t}$, $C(p^t)$ is a curvature feature of $p^t$, and $C(q^t)$ is a curvature feature of $q^t$.

There is strong correlation between curvature features of data points and an organ adjacency region: a data point at the organ adjacency region usually has a greater curvature. The cost at which $V_{p^t,q^t}(f_B(p^t), f_B(q^t))$ divides adjacent data points into different categories at different kinds of organ adjacency regions is smaller, which can make the data points at different kinds of organ adjacency regions divided into different categories as much as possible, while the cost at which adjacent data points of the same organ are divided into different categories is greater, so as to ensure smoothness of classification.

The target energy function is a typical Markov Random Fields question, and the graph cut algorithm can be used for approximate solution.

The classification unit 421 is configured to classify the data points in the point cloud frame to be divided as lamina points or stem points according to the classification function obtained through solving.

Specifically, if the target energy function reaches the smallest classification function to map a certain data point in the point cloud frame to be divided to L, the data point is classified as a lamina point; if the classification function maps the data point to S, the data point is classified as a stem point.

The lamina point cloud block aggregation module 402 is configured to aggregate lamina points, which are connected with each other, in the point cloud frame to be divided to make up a lamina point cloud block.

The stem point cloud block aggregation module 403 is configured to establish a minimum spanning tree of stem points in the point cloud frame to be divided, divide the minimum spanning tree into a separate branch that do not comprise forked stems, and map the stem points in the point cloud frame onto respective separate branches, to form respective stem point cloud blocks, wherein one separate branch corresponds to one stem point cloud block.

Before establishing a minimum spanning tree of stem points in the point cloud frame to be divided, the stem point cloud block aggregation module 403 may perform preset processing on the stem points in the point cloud frame to be divided at first. Specifically, a preset proportion (e.g., 10%) of stem points in the point cloud frame to be divided are sampled to obtain sampling points, and the sampling points are projected to the center where the sampling points are adjacent to the data points to gather the sampling points together onto a stem centerline, to screen out one sampling points in two sampling points between which the distance is less than a preset value. The stem point cloud block aggregation module 403 can establish the minimum spanning tree according to the remaining sampling points.

Further, the stem point cloud block aggregation module 403 may delete nodes whose degrees are greater than 2 in the minimum spanning tree, to cause stems of the minimum spanning tree to be disconnected at the deleted nodes, so as to generate separate branches not containing forked stems. Further, the separate branches shorter than a threshold can be deleted.

The separate organ point cloud block extraction module 404 is configured to find out point cloud blocks, which have most overlapping data points, corresponding to each lamina point cloud block and each stem point cloud block in the point cloud frame to be divided and the adjacent point cloud frame, mark the corresponding point cloud blocks, and extract the lamina point cloud blocks and the stem point cloud blocks, which are marked less than twice, in the point cloud frame to be divided and the adjacent point cloud frame.

In one embodiment, it is likely that the separate organ point cloud block extraction module 404 starts from each lamina point cloud block of the point cloud frame to be divided and the adjacent point cloud frame, finds out, in the other point cloud frame of the two point cloud frames other than the point cloud frame where the lamina point cloud block is, a lamina point cloud block overlapping with the point cloud frame to the greatest extent, marks one outgoing edge from the lamina point cloud block to the lamina point cloud block overlapping therewith to the greatest extent, and then screens out all lamina point cloud blocks whose in-degree is greater than 2.

As shown in FIG. 5, the point cloud frame to be divided and the adjacent point cloud frame include lamina point cloud blocks S1, S2, S3, S4, S5, S6 and S7. The lamina point cloud block overlapping with S1 to the greatest extent is S5, and the separate organ point cloud block extraction module 404 can mark one outgoing edge from S1 to S5; the lamina point cloud block overlapping with S2 to the greatest extent is also S5, and the separate organ point cloud block extraction module 404 can mark one outgoing edge from S2 to S5; the lamina point cloud block overlapping with S5 to the greatest extent is also S1, and the separate organ point cloud block extraction module 404 can mark one outgoing edge from S5 to S1; and other lamina point cloud blocks are marked by analogy. Finally, the lamina point cloud blocks whose in-degree is greater than 2 are S3 and S5, S3 and S5 are deleted, and S1, S2, S4, S6 and S7 are left. The remaining lamina point cloud blocks all include single separate laminas.

The lamina point cloud block redividing module 405 is configured to classify the lamina points in the point cloud frame to be divided to categories corresponding to the lamina point cloud blocks extracted, and make the lamina points within the same category form one lamina point cloud block in the point cloud frame to be divided.

A distance between a lamina point and a lamina point cloud block is a distance between the lamina point and the nearest data point in the lamina point cloud block.

Specifically, the corresponding categories of the lamina point cloud blocks extracted are respectively denoted as $L_1, L_2, \ldots, L_m$, LP is a set of lamina points in the point cloud frame to be divided, and $f_L(\ )$ is a lamina classification function that maps LP to $\{L_1, L_2, \ldots, L_m\}$.

The lamina point cloud block redividing module 405 is configured to solve to cause the following lamina classification cost function $E(f_L)$ to reach the least lamina point classification function $f_L(\ )$, and classify the lamina points in the point cloud frame to be divided to the categories corresponding to the lamina point cloud blocks extracted according to the lamina point classification function obtained through solving:

$$E(f_L) = \sum_{p^t \in LP} D_{p^t}(f_L(p^t)) + \sum_{p^t,q^t \in N_{L^t}} V_{p^t,q^t}(f_L(p^t), f_L(q^t))$$

wherein:
(1)

$$D_{p^t}(f_L(p^t)) = d(p^t, f_L(p^t))$$

$D_{p^t}(f_L(p^t))$ denotes the cost that classifies a lamina point $p^t$ to $f_L(p^t)$, and $d(p^t, f_L(p^t))$ denotes a distance from a data point $p^t$ to the nearest point in a target block $f_L(p^t)$;
(2)
$q^t$ is a data point adjacent to $p^t$ in LP;
$N_{L^t} = \{(P^t, q^t)\} = \{(p^t, q^t) \in \text{Delaunay}(P^t) : |p^t - q^t| < \epsilon\}$, $N_{L^t}$ is a neighborhood system formed based on Delaunay triangulation on LP and removal of sides greater than a threshold $\epsilon$; and $V_{p^t,q^t}(\ )$ is defined the same as the $V_{p^t,q^t}(\ )$, and $V_{p^t,q^t}(f_L(p^t), f_L(q^t))$ denotes the cost that classifies adjacent data points $p^t$ and $q^t$ as $f_L(p^t)$ and $f_L(q^t)$.

The stem point cloud block redividing module 406 is configured to classify the stem points in the point cloud frame to be divided to categories corresponding to the lamina point cloud blocks extracted, and make the stem points within the same category form one stem point cloud block in the point cloud frame to be divided.

In one embodiment, the categories corresponding to the stem point cloud blocks extracted by the separate organ point cloud block extraction module 404 are respectively denoted as $S_1, S_2, \ldots, S_n$, SP is a set of stem points in the point cloud frame to be divided, and $f_S(\ )$ is a stem classification function that maps SP to $\{S_1, S_2, \ldots, S_n\}$; and the stem point cloud block redividing module 406 is configured to solve to cause the following stem classification cost function $E(f_S)$ to reach the least stem point classification function $f_S(\ )$, and classify the stem points in the point cloud frame to be divided to the categories corresponding to the stem point cloud blocks extracted according to the stem point classification function obtained through solving:

$$E(f_s) = \sum_{p^t \in sp} D_{p^t}(f_s(p^t)) + \sum_{p^t,q^t \in N_{s^t}} V_{p^t,q^t}(f_s(p^t), f_s(q^t))$$

wherein:
(1)

$$D_{p^t}(f_S(p^t)) = \begin{cases} o(p^t) - O(f_S(p^t)) & \text{if } d(p^t, f_S(p^t)) \leq \Delta \\ \gamma & \text{if } d(p^t, f_S(p^t)) \geq \Delta \end{cases}$$

$D_{p^t}(f_S(p^t))$ denotes the cost that classifies a stem point $p^t$ to $f_S(p^t)$, $o(p^t)$ is orientation information of $p^t$, $o(p^t)=(x,y,z)$, wherein x, y and z are diagonal elements of an eigenvector matrix obtained by principal component analysis on neighborhood points of $p^t$, $O(f_S(p^t))$ is an average value of orientation information of all stem points in a stem point cloud block corresponding to $f_S(p^t)$, $\Delta$ is a preset distance threshold, is a preset penalty term, and $d(p^t, f_S(p^t))$ is a distance between $d(p^t, f_S(p^t))$ and the stem point cloud block corresponding to $f_S(p^t)$;
(2)
$q^t$ is a data point adjacent to $p^t$ in SP;
$N_{S^t} = \{(p^t, q^t)\} = \{(p^t, q^t) \in \text{Delaunay}(P^t) : |p^t - q^t| < \epsilon\}$, $N_{S^t}$ is a neighborhood system formed based on Delaunay triangulation on SP and removal of sides greater than a threshold $\epsilon$; and $V_{p^t,q^t}(\ )$ is defined the same as the $V_{p^t,q^t}(\ )$, and $V_{p^t,q^t}(f_S(p^t), f_S(q^t))$ denotes the cost that classifies adjacent data points $p^t$ and $q^t$ as $f_S(p^t)$ and $f_S(q^t)$.

In the documents of the present application, the distance between a data point and a point cloud block refers to a distance between the data point and the nearest data point in the point cloud block.

In one embodiment, the first point cloud frame dividing module 20 is configured to take the first point cloud frame F as the point cloud frame to be divided, classify the data point of $F^1$ as a lamina point or a stem point according to the processing procedures of the classification function solving unit 411 and the classification unit 412, and divide the point cloud in $F^1$ into a lamina point cloud block and a stem point cloud block according to the processing procedures of the lamina point cloud block aggregation module 402 and the stem point cloud block aggregation module 403, and when the classification function is solved according to the processing procedure of the classification function solving unit 411, calculation of $D_{p^t}(L)$ and $D_{p^t}(S)$ applies to $|\{L_l\}|=0$ and $|\{S_s\}|=0$.

According to the system for dividing a plant organ point cloud, point cloud frames corresponding to multiple plant growth times of a monitored plant are acquired, and the acquired point cloud frames are divided; according to information about lamina point cloud blocks and stem point cloud blocks in a previous adjacent point cloud frame of a point cloud frame to be divided and a flatness feature of a data point of the point cloud frame to be divided, a point cloud of the point cloud frame to be divided is divided into lamina point cloud blocks and stem point cloud blocks; taking the adjacent point cloud frame as a reference to divide the point cloud frame facilitates the divided organ in maintaining the consistency of time and space between adjacent point cloud frames, and improves the accuracy of plant organ division. Moreover, when a new lamina point cloud block or a stem point cloud block is discovered, the point cloud in the point cloud frame before the point cloud block to be divided is redivided through tracking back, until the number of the lamina point cloud blocks and the stem point cloud blocks of the redivided point cloud frame does not increase; when redividing, according to information about the lamina point cloud blocks and the stem point cloud blocks in the next adjacent point cloud frame of the new lamina point cloud block or stem point cloud block, the point cloud frame to be redivided is divided; and the redivision during tracking back facilitates extracting, from the point cloud frame, a new lamina point cloud block or a stem point cloud block which was not discovered in the previous division process, thereby further improving the accuracy of plant organ division.

Those of ordinary skill in the art can understand and implement all or some processes in the methods of the embodiments, which can be accomplished by a computer program controlling related hardware; the program can be stored in a computer readable storage medium, and during execution, the program may include the processes of the embodiments of the methods. The storage medium may be a magnetic disc, an optical disc, a Read-Only Memory (ROM) or a Random Access Memory (RAM), and so on.

The embodiments merely express several implementations of the present invention, the description thereof is more specific and detailed, but cannot be understood as limitations to the patent scope of the present invention. It should be noted that those of ordinary skill in the art can make several variations and improvements without departing from the concept of the present invention, and the variations and improvements all fall within the protection scope of the present invention. Therefore, the protection scope of the present invention should be subject to the claims.

What is claimed is:

1. A method for dividing a plant organ point cloud, comprising the following steps S120-S160:
    S120: acquiring point cloud frames corresponding to multiple plant growth times of a monitored plant, and denoting the acquired multiple point cloud frames as $F^1, \ldots, F^t, \ldots, F^n$ according to a sequence of the corresponding plant growth times;
    S140: dividing a point cloud in the first point cloud frame $F^1$ into a lamina point cloud block and a stem point cloud block according to a flatness feature of a data point in the first point cloud frame $F^1$; and
    S160: dividing the point cloud frames $F^2$ to $F^n$ after the first point cloud frame into lamina point cloud blocks and stem point cloud blocks according to a sequence of corresponding plant growth times, wherein the dividing a point cloud in a certain point cloud frame $F^t$ ($2 \le t \le n$) into a lamina point cloud block and a stem point cloud block comprises the following steps S220-S280:
    S220: according to information about a lamina point cloud block and a stem point cloud block in a previous point cloud frame $F^{t-1}$ of $F^t$ and a flatness feature of a data point of the $F^t$, dividing the point cloud in the $F^t$ into a lamina point cloud block and a stem point cloud block;
    S240: judging whether the number of the stem point cloud blocks contained in $F^t$ is larger than that of the stem point cloud blocks contained in $F^{t-1}$ or whether the number of the lamina point cloud blocks contained in $F^t$ is larger than that of the lamina point cloud blocks contained in $F^{t-1}$, if no, performing step S260, and if yes, performing step S280;
    S260: if t<n, entering the step of dividing the point cloud in the next point cloud frame $F^{t+1}$ of $F^t$ into lamina point cloud blocks and stem point cloud blocks, if t=n, ending; and
    S280: tracking back to successively redivide the point cloud in the previous point cloud frame of the $F^t$ until the number of the lamina point cloud blocks and the stem point cloud blocks of the redivided point cloud frame does not increase, and then stopping tracking back and entering the step of dividing the point cloud in the next point cloud frame $F^{t+1}$ of $F^t$ into lamina point cloud blocks and stem point cloud blocks, and the step of redividing the point cloud of a certain point cloud frame $F^j$ ($1 \le j \le t-1$) before $F^t$ comprises:
    S282: according to the information about the lamina point cloud blocks and the stem point cloud blocks in the next point cloud frame $F^{j+1}$ of $F^j$ and the flatness feature of the data points of $F^j$, dividing the point cloud in $F^j$ into the lamina point cloud blocks and the stem point cloud blocks.

2. The method for dividing a plant organ point cloud according to claim 1, wherein, if the $F^t$ in step S220 is denoted as a point cloud frame to be divided, the $F^{t-1}$ is denoted as an adjacent point cloud frame of the point cloud frame to be divided, the $F^j$ in step S282 is denoted as a point cloud frame to be divided, and the $F^{j+1}$ is denoted as an adjacent point cloud frame of the point cloud frame to be divided, the step of, according to information about lamina point cloud blocks and stem point cloud blocks in an adjacent point cloud frame of a point cloud frame to be divided and a flatness feature of a data point of the point cloud frame to be divided, dividing a point cloud of the point cloud frame to be divided into lamina point cloud blocks and stem point cloud blocks comprises the following steps S310-S360:
    S310: according to the information about lamina point cloud blocks and stem point cloud blocks in the adjacent point cloud frame of the point cloud frame to be divided and the flatness feature of the data point in the point cloud frame to be divided, classifying the data point in the point cloud frame to be divided as a lamina point or a stem point;
    S320: aggregating lamina points, which are connected with each other, in the point cloud frame to be divided to make up a lamina point cloud block;
    S330: establishing a minimum spanning tree of stem points in the point cloud frame to be divided, dividing the minimum spanning tree into a separate branch that do not comprise forked stems, and mapping the stem points in the point cloud frame onto respective separate branches, to form respective stem point cloud blocks, wherein one separate branch corresponds to one stem point cloud block;
    S340: finding out point cloud blocks, which have most overlapping data points, corresponding to each lamina point cloud block and each stem point cloud block in the point cloud frame to be divided and the adjacent point cloud frame, marking the corresponding point cloud blocks and the stem point cloud blocks, which are marked less than twice, in the point cloud frame to be divided and the adjacent point cloud frame;

S350: classifying the lamina points in the point cloud frame to be divided to categories corresponding to the lamina point cloud blocks extracted, and making the lamina points within the same category form one lamina point cloud block in the point cloud frame to be divided; and S360: classifying the stem points in the point cloud frame to be divided to categories corresponding to the lamina point cloud blocks extracted, and making the stem points within the same category form one stem point cloud block in the point cloud frame to be divided.

3. The method for dividing a plant organ point cloud according to claim 2, wherein step S310 comprises the following steps:

S410: solving to cause a target energy function to reach the least classification function, the target energy function being a function about a classification function, of which the function value denotes classification cost, and the classification function being a classification function that classifies data points of the point cloud frame to be divided into lamina points and stem points;

wherein a data point set in the point cloud frame to be divided is denoted as $P^t=\{p^t\}$ and a plant organ data point category set is denoted as $\{L,S\}$, wherein L represents a lamina point category, S represents a stem point set, $f_B$ is a classification function that maps $P^t$ to the set $\{L,S\}$ and the target energy function is as follows:

$$E(f_B) = \sum_{p^t \in P^t} D_{p^t}(f_B(p^t)) + \sum_{p^t, q^t \in N_{p^t}} V_{p^t,q^t}(f_B(p^t), f_B(q^t))$$

wherein:

(1) $D_{p^t}(f_B(p^t))$ denotes the cost at which a data point of $p^t$ is classified as $f_B(p^t)$;

$$D_{p^t}(L) = \begin{cases} \max(R(p^t) - R(L_{l*}), 0) & \text{if } |\{L_l\}| \neq 0 \text{ and } |\{S_s\}| \neq 0 \\ R(p^t) - \Re_L & \text{if } |\{L_l\}| = 0 \text{ or } |\{S_s\}| = 0 \end{cases}$$

$$D_{p^t}(S) = \begin{cases} \max(R(S_{s*}) - R(p^t), 0), & \text{if } |\{L_l\}| \neq 0 \text{ and } |\{S_s\}| \neq 0 \\ \Re_S - R(p^t), & \text{if } |\{L_l\}| = 0 \text{ or } |\{S_s\}| = 0 \end{cases}$$

$D_{p^t}(L)$ is the cost of $f_B(p^t)=L$, and $D_{p^t}(S)$ is the cost of $D_{p^t}(S)$, $R(p^t)$ is a flatness feature of $p^t$, $R(p^t)=\log(\max(C(p^t),c_\epsilon))$, $c_\epsilon$ is a preset constant greater than 0 and less than ⅓, $C(p^t)$ is a curvature feature of $p^t$, $C(p^t)=\lambda_1/\lambda_1+\lambda_2+\lambda_3)$, wherein $\lambda_1$, $\lambda_2$ and $\lambda_3$ are eigenvalues obtained by principal component analysis on neighborhood points of $p^t$, and $\lambda_1 \leq \lambda_2$ and $\lambda_1 \leq \lambda_3$;

$\{L_l\}$ is a set of lamina point cloud blocks in an adjacent point cloud frame, $|\{L_l\}|$ is the number of $\{L_l\}$ elements, $L_{l*}$ is a lamina point cloud block, nearest the $p^t$, in $\{L_l\}$, and $R(L_{l*})$ is an average value of flatness features of data points in the $L_{l*}$; $\{S_s\}$ is a set of stem point cloud blocks in the adjacent point cloud frame, $|\{S_s\}|$ is the number of $\{S_s\}$ elements, $S_{s*}$, is a stem point cloud block, nearest the $p^t$, in $\{S_s\}$, and $R(S_{s*})$ is an average value of flatness features of data points in the $S_{s*}$;

$$\Re_L = \log(c_\epsilon), \Re_S = \log\left(\frac{1}{3}\right);$$

(2) $q^t$ is a data point adjacent to $p^t$ in $P^t$;

$N_{p^t}$ is a neighborhood system formed based on Delaunay triangulation on $P^t$ and removal of sides greater than a threshold $\epsilon$;

$V_{p^t,q^t}(f_B(p^t),f_B(q^t))$ denotes the cost at which adjacent data points $p^t$ and $q^t$ are classified as $f_B(p^t)$ and $f_B(q^t)$, $$V_{p^t,q^t}(f_B(p^t), f_B(q^t)) = \begin{cases} \max\left(\frac{1}{C(p^t)}, \frac{1}{C(q^t)}\right) & \text{if } f(p^t) \neq f(q^t) \\ 0, & \text{if } f(p^t) = f(q^t) \end{cases}$$

wherein $(p^t,q^t) \in N_{p^t}$, $C(p^t)$ is a curvature feature of $p^t$, and $C(q^t)$ is a curvature feature of $q^t$; and S420: classifying the data points in the point cloud frame to be divided as lamina points or stem points $L_1, L_2, \ldots, L_m$ according to the classification function obtained through solving.

4. The method for dividing a plant organ point cloud according to claim 3, wherein the corresponding categories of the lamina point cloud blocks extracted are respectively denoted as $L_1, L_2, \ldots, L_m$, LP is a set of lamina points in the point cloud frame to be divided, and $F_L(\ )$ is a lamina classification function that maps LP to $\{L_1, L_2, \ldots, L_m\}$; and the step of classifying the lamina points in the point cloud frame to be divided to categories corresponding to the lamina point cloud blocks extracted in step S350 is: solving to cause the following lamina classification cost function $E(f_L)$ to reach the least lamina point classification function $f_L(\ )$, and classifying the lamina points in the point cloud frame to be divided to the categories corresponding to the lamina point cloud blocks extracted according to the lamina point classification function obtained through $$E(f_L) = \sum_{p^t \in LP} D_{p^t}(f_L(p^t)) + \sum_{p^t, q^t \in N_{L^t}} V_{p^t,q^t}(f_L(p^t), f_L(q^t))$$

wherein:

(1)

$$D_{p^t}(f_L(p^t))=d(p^t,f_L(p^t))$$

$D_{p^t}(f_L(p^t))$ denotes the cost at which a lamina point $p^t$ is classified to $f_L(p^t)$, and $d(p^t,f_L(p^t))$ denotes a distance from a data point $p^t$ to the nearest point in a target block $f_L(p^t)$;

(2)

$q^t$ is a data point adjacent to $p^t$ in LP;

$N_{L^t}$ is a neighborhood system formed based on Delaunay triangulation on LP and removal of sides greater than a threshold $\epsilon$; and $V_{p^t,q^t}(\ )$ is defined the same as the $V_{p^t,q^t}(\ )$, and $V_{p^t,q^t}(f_L(p^t),f_L(q^t))$ denotes the cost at which adjacent data points $p^t$ and $q^t$ are classified as $f_L(p^t)$ and $f_L(q^t)$.

5. The method for dividing a plant organ point cloud according to claim 3, wherein the categories corresponding to the stem point cloud blocks extracted are respectively denoted as $S_1, S_2, \ldots, S_n$, SP is a set of stem points in the point cloud frame to be divided, and $f_S(\ )$ is a stem classification function that maps SP to $\{S_1, S_2, \ldots, S_n\}$; and the step of classifying the stem points in the point cloud frame to be divided to categories corresponding to the stem point cloud blocks extracted in step S360 is: solving to cause the following stem classification cost function $E(f_S)$ to reach the least stem point classification function $f_S(\ )$, and classifying the stem points in the point cloud frame to be divided to the categories corresponding to the stem point cloud blocks extracted according to the stem point classification function obtained through solving:

$$E(f_S) = \sum_{p^t \in SP} D_{p^t}(f_S(p^t)) + \sum_{p^t, q^t \in N_{S^t}} V_{p^t, q^t}(f_S(p^t), f_S(q^t))$$

wherein:
(1)

$$D_{p^t}(f_S(p^t)) = \begin{cases} o(p^t) - O(f_S(p^t)) & \text{if } d(p^t, f_S(p^t)) \leq \Delta \\ \gamma & \text{if } d(p^t, f_S(p^t)) \geq \Delta \end{cases}$$

$D_{p^t}(f_S(p^t))$ denotes the cost at which a stem point $p^t$ is classified to $f_S(p^t)$, $o(p^t)$ is orientation information of $p^t$, $o(p^t)=(x,y,z)$, wherein x, y and z are diagonal elements of an eigenvector matrix obtained by principal component analysis on neighborhood points of $p^t$, $O(f_S(p^t))$ is an average value of orientation information of all stem points in a stem point cloud block corresponding to $f_S(p^t)$, $\Delta$ is a present distance threshold, $\gamma$ is a preset penalty term, and $d(p^t, f_S(p^t))$ is a distance between $d(p^t, f_S(p^t))$ and the stem point cloud block corresponding to $f_S(p^t)$;

(2)
$q^t$ is a data point adjacent to $p^t$ in SP;
$N_{S^t}$ is a neighborhood system formed based on Delaunay triangulation on SP and removal of sides greater than a threshold $\epsilon$; and
$V_{p^t, q^t}(\ )$ is defined the same as the $V_{p^t, q^t}(\ )$, and $V_{p^t, q^t}(f_S(p^t), f_S(q^t))$ denotes the cost at which adjacent data points $p^t$ and $q^t$ are classified as $f_S(p^t)$ and $f_S(q^t)$.

6. The method for dividing a plant organ point cloud according to claim 3, wherein the first point cloud frame $F^1$ is taken as the point cloud frame to be divided, in step S140, the point cloud in the first point cloud frame $F^1$ can be divided into a lamina point cloud block and a stem point cloud block according to steps S410, S420, S320 and S330, and during calculation, calculation of $D_{p^t}(L)$ and $D_{p^t}(S)$ applies to $|\{L_{ij}\}|=0$ and $|\{S_s\}|=0$.

7. A system for dividing a plant organ point cloud, comprising a storage medium that stores machine-readable instructions and a processor configured to read and execute the instructions stored in the storage medium to:

acquire point cloud frames corresponding to multiple plant growth times of a monitored plant, and denote the acquired multiple point cloud frames as $F^1$, UOTF$^t$, UOTF$^n$ according to a sequence of the corresponding plant growth times;

divide a point cloud in the first point cloud frame $F^1$ into a lamina point cloud block and a stem point cloud block according to a flatness feature of a data point in the first point cloud frame $F^1$;

take $F^t(2 \leq t \leq n)$ successively in the point cloud frames $F^2$ to $F^n$ after the first point cloud frame according to a sequence of corresponding plant growth times, transfer the $F^t$ as a point cloud frame to be divided and a previous point cloud frame $F^{t-1}$ of the $F^t$ as an adjacent point cloud frame of the point cloud frame to be divided;

according to information about a lamina point cloud block and a stem point cloud block in the adjacent point cloud frame of the point cloud frame to be divided and a flatness feature of a data point of the point cloud frame to be divided, divide the point cloud in the point cloud frame to be divided into a lamina point cloud block and a stem point cloud block;

dividing the $F^t$, judge whether the number of the stem point cloud blocks contained in $F^t$ is larger than that of the stem point cloud blocks contained in $F^{t-2}$ or whether the number of the lamina point cloud blocks contained in $F^t$ is larger than that of the lamina point cloud blocks contained in $F^{t-1}$, if no, when t<n, notify the scheduling module to schedule the point cloud dividing module, to divide the point cloud in the next point cloud frame $F^{t+1}$ of $F^t$ into lamina point cloud blocks and stem point cloud blocks, when t=n, end, and if yes, then:

to take $F^j(1 \leq j \leq t-1)$ successively in $F^{t-1}$ to $F^1$ according to a reverse sequence of corresponding plant growth times, transfer the $F^j$ as a point cloud frame to be divided and the next point cloud frame $F^{j+1}$ of the $F^j$ as an adjacent point cloud frame of the point cloud frame to be divided, and to redivide the point cloud in the point cloud frame before the $F^t$, until the number of the lamina point cloud blocks and the stem point cloud blocks of the redivided point cloud frame does not increase, and schedule to divide the point cloud in the next point cloud frame $F^{t-1}$ of $F^t$ into lamina point cloud blocks and stem point cloud blocks.

8. The system for dividing a plant organ point cloud according to claim 7, wherein the processor is further configured to read and execute the instructions stored in the storage medium to:

according to the information about lamina point cloud blocks and stem point cloud blocks in the adjacent point cloud frame of the point cloud frame to be divided and the flatness feature of the data point in the point cloud frame to be divided, classify the data point in the point cloud frame to be divided as a lamina point or a stem point;

aggregate lamina points, which are connected with each other, in the point cloud frame to be divided to make up a lamina point cloud block;

establish a minimum spanning tree of stem points in the point cloud frame to be divided, divide the minimum spanning tree into a separate branch that do not comprise forked stems, and map the stem points in the point cloud frame onto respective separate branches, to form respective stem point cloud blocks, wherein one separate branch corresponds to one stem point cloud block;

find out point cloud blocks, which have most overlapping data points, corresponding to each lamina point cloud block and each stem point cloud block in the point cloud frame to be divided and the adjacent point cloud frame, mark the corresponding point cloud blocks, and extract the lamina point cloud blocks and the stem point cloud blocks, which are marked less than twice, in the point cloud frame to be divided and the adjacent point cloud frame;

classify the lamina points in the point cloud frame to be divided to categories corresponding to the lamina point cloud blocks extracted, and make the lamina points within the same category form one lamina point cloud block in the point cloud frame to be divided; and classify the stem points in the point cloud frame to be divided to categories corresponding to the lamina point cloud blocks extracted, and make the stem points within the same category form one stem point cloud block in the point cloud frame to be divided.

9. The system for dividing a plant organ point cloud according to claim 8, wherein the processor is further configured to read and execute the instructions stored in the storage medium to:

solve to cause a target energy function to reach the least classification function, the target energy function being a function about a classification function, of which the function value denotes classification cost, and the classification function being a classification function that classifies data points of the point cloud frame to be divided into lamina points and stem points;

wherein a data point set in the point cloud frame to be divided is denoted as $P^t=\{p^t\}$ and a plant organ data point category set is denoted as $\{L,S\}$, wherein L represents a lamina point category, S represents a stem point set, $f_B$ is a classification function that maps $P^t$ to the set $\{L,S\}$, and the target energy function is as follows:

$$E(f_S) = \sum_{p^t \in p^t} D_{p^t}(f_S(p^t)) + \sum_{p^t, q^t \in N_{S^t}} V_{p^t, q^t}(f_S(p^t), f_S(q^t))$$

wherein:

(1) $D_{p^t}(f_S(p^t))$ denotes the cost at which a data point of $p^t$ is classified as $f_B(p^t)$;

$$D_{p^t}(L) = \begin{cases} \max(R(p^t) - R(L_{l*}), 0) & \text{if } |\{L_l\}| \neq 0 \text{ and } |\{S_s\}| \neq 0 \\ R(p^t) - \mathcal{R}_L & \text{if } |\{L_l\}| = 0 \text{ or } |\{S_s\}| = 0 \end{cases}$$

$$D_{p^t}(S) = \begin{cases} \max(R(S_{s*}) - R(p^t), 0), & \text{if } |\{L_l\}| \neq 0 \text{ and } |\{S_s\}| \neq 0 \\ \mathcal{R}_S - R(p^t), & \text{if } |\{L_l\}| = 0 \text{ or } |\{S_s\}| = 0 \end{cases}$$

$D_{p^t}(L)$ is the cost of $f_B(p^t)=L$, and $D_{p^t}(S)$ is the cost of $D_{p^t}(S)$, $R(p^t)$ is a flatness feature of $p^t$, $R(p^t)=\log(\max(C(p^t),c_\epsilon))$, $c_\epsilon$ is a preset constant greater than 0 and less than ⅓, $C(p^t)$ is a curvature feature of $p^t$, $C(p^t)=\lambda_2/(\lambda_1+\lambda_2+\lambda_3)$, wherein $\lambda_1$, $\lambda_2$ and $\lambda_3$ are eigenvalues obtained by principal component analysis on neighborhood points of $p^t$, and $1 \leq \lambda 2$ and $1 \leq \lambda 3$;

$\{L_l\}$ is a set of lamina point cloud blocks in an adjacent point cloud frame, $|\{L_l\}|$ is the number of $\{L_l\}$ elements, $L_{l*}$ is a lamina point cloud block, nearest the $p^t$, in $\{L_l\}$, and $R(L_{l*})$ is an average value of flatness features of data points in the $L_{l*}$; $\{S_s\}$ is a set of stem point cloud blocks in the adjacent point cloud frame, $|\{S_s\}|$ is the number of $\{S_s\}$ elements, $S_{s*}$ is a stem point cloud block, nearest the $p^t$, in $\{S_s\}$, and $R(S_{s*})$ is an average value of flatness features of data points in the $S_{s*}$;

$$\mathcal{R}_L = \log(c_\epsilon), \mathcal{R}_S = \log\left(\frac{1}{3}\right);$$

(2) $q^t$ is a data point adjacent to $p^t$ in $P^t$;

$N_{p^t}$ is a neighborhood system formed based on Delaunay triangulation on $P^t$ and removal of sides greater than a threshold $\epsilon$;

$V_{p^t,q^t}(f_B(p^t),f_B(q^t))$ denotes the cost at which adjacent data points $p^t$ and $q^t$ are classified as $f_B(p^t)$ and $f_B(q^t)$, $$V_{p^t,q^t}(f_B(p^t), f_B(q^t)) = \begin{cases} \max\left(\frac{1}{C(p^t)}, \frac{1}{C(q^t)}\right) & \text{if } f(p^t) \neq f(q^t) \\ 0, & \text{if } f(p^t) = f(q^t) \end{cases}$$

wherein $(p^t,q^t) \in N_{p^t}$, $C(p^t)$ is a curvature feature of $p^t$, and $C(q^t)$ is a curvature feature of $q^t$; and classify the data points in the point cloud frame to be divided as lamina points or stem points according to the classification function obtained through solving.

10. The system for dividing a plant organ point cloud according to claim 9, wherein the corresponding categories of the lamina point cloud blocks extracted are respectively denoted as $L_1, L_2, \ldots, L_m$, LP is a set of lamina points in the point cloud frame to be divided, and $f_L(\ )$ is a lamina classification function that maps LP to $\{L_1, L_2, \ldots, L_m\}$; and the processor is further configured to read and execute the instructions stored in the storage medium to solve to cause the following lamina classification cost function $E(f_L)$ to reach the least lamina point classification function $f_L(\ )$, and classify the lamina points in the point cloud frame to be divided to the categories corresponding to the lamina point cloud blocks extracted according to the lamina point classification function obtained through solving:

$$E(f_L) = \sum_{p^t \in LP} D_{p^t}(f_L(p^t)) + \sum_{p^t, q^t \in N_{L^t}} V_{p^t, q^t}(f_L(p^t), f_L(q^t))$$

wherein:

(1)

$$D_{p^t}(f_L(p^t)) = d(p^t, f_L(p^t))$$

$D_{p^t}(f_L(p^t))$ denotes the cost at which a lamina point $p^t$ is classified to $f_L(p^t)$, and $d(p^t, f_L(p^t))$ denotes a distance from a data point $p^t$ to the nearest point in a target block $f_L(p^t)$;

(2)

$q^t$ is a data point adjacent to $p^t$ in LP;

$N_{L^t}$ is a neighborhood system formed based on Delaunay triangulation on LP and removal of sides greater than a threshold $\epsilon$; and $V_{p^t,q^t}(\ )$ is defined the same as the $V_{p^t,q^t}(\ )$, and $V_{p^t,q^t}(f_L(p^t),f_L(q^t))$ denotes the cost at which adjacent data points $p^t$ and $q^t$ are classified as $f_L(p^t)$ and $f_L(q^t)$.

11. The system for dividing a plant organ point cloud according to claim 9, wherein the categories corresponding to the stem point cloud blocks extracted are respectively denoted as $S_1, S_2, \ldots, S_m$, SP is a set of stem points in the point cloud frame to be divided, and $f_S()$ is a stem classification function that maps SP to $\{S_1, S_2, \ldots, S_n\}$; and the processor is further configured to read and execute the instructions stored in the storage medium to solve to cause the following stem classification cost function $E(f_S)$, to reach the least stem point classification function $f_S()$, and classify the stem points in the point cloud frame to be divided to the categories corresponding to the stem point cloud blocks extracted according to the stem point classification function obtained through solving:

$$E(f_S) = \sum_{p^t \in SP} D_{p^t}(f_S(p^t)) + \sum_{p^t, q^t \in N_{S^t}} V_{p^t, q^t}(f_S(p^t), f_S(q^t))$$

wherein:

(1)

$$D_{p^t}(f_S(p^t)) = \begin{cases} o(p^t) - O(f_S(p^t)) & \text{if } d(p^t, f_S(p^t)) \leq \Delta \\ \gamma & \text{if } d(p^t, f_S(p^t)) \geq \Delta \end{cases}$$

$D_{p^t}(f_S(p^t))$ denotes the cost at which a stem point $p^t$ is classified to $f_S(p^t)$, $o(p^t)$ is orientation information of $p^t$, $o(p^t)=(x,y,z)$, wherein x, y and z are diagonal elements of an eigenvector matrix obtained by principal component analysis on neighborhood points of $p^t$, $O(f_S(p^t))$ is an average value of orientation information of all stem points in a stem point cloud block corresponding to $f_S(p^t)$, $\Delta$ is a preset distance threshold, $\gamma$ is a preset penalty term, and $d(p^t, f_S(p^t))$ is a distance between $d(p^t, f_S(p^t))$ and the stem point cloud block corresponding to $f_S(p^t)$;

(2)

$q^t$ is a data point adjacent to in SP;

$N_{S^t}$ is a neighborhood system formed based on Delaunay triangulation on SP and removal of sides greater than a threshold $\epsilon$; and $V_{p^t, q^t}()$ is defined the same as the $V_{p^t, q^t}()$, and $V_{p^t, q^t}(f_S(p^t), f_S(q^t))$ denotes the cost at which adjacent data points $p^t$ and $q^t$ are classified as $f_S(p^t)$ and $f_S(q^t)$.

12. The system for dividing a plant organ point cloud according to claim 9, wherein the processor is further configured to read and execute the instructions stored in the storage medium to take the first point cloud frame $F^1$ as the point cloud frame to be divided, classify the data point of $F^1$ as a lamina point or a stem point, and divide the point cloud in $F^1$ into a lamina point cloud block and a stem point cloud block, and when the classification function is solved, calculation of $D_{p^t}(L)$ and $D_{p^t}(S)$ applies to $|\{L_l\}|=0$ and $|\{S_s\}|=0$.

* * * * *